Nov. 6, 1962

G. M. EULER 3,062,943

COMBINATION MANUAL AND AUTOMATIC TIME
AND TEMPERATURE CONTROL SYSTEM

Filed Aug. 11, 1961

INVENTOR.
GEORGE M. EULER
BY
Prangley, Baird Clayton,
Miller & Vogel
ATTORNEY

INVENTOR.
GEORGE M. EULER

Nov. 6, 1962
G. M. EULER
3,062,943
COMBINATION MANUAL AND AUTOMATIC TIME
AND TEMPERATURE CONTROL SYSTEM
Filed Aug. 11, 1961
7 Sheets-Sheet 4
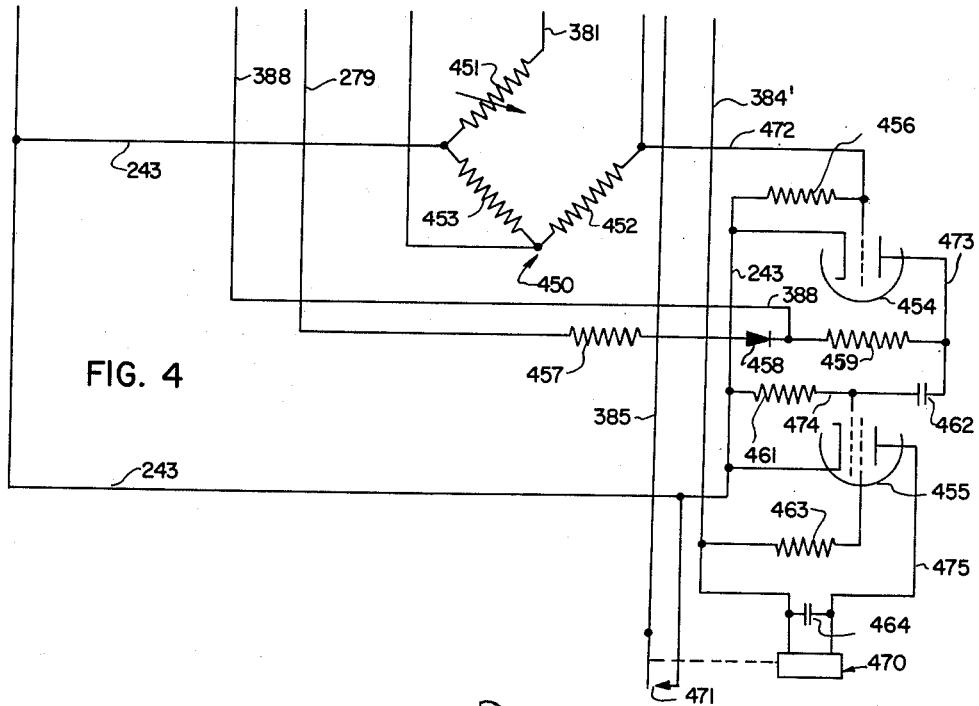
FIG. 4
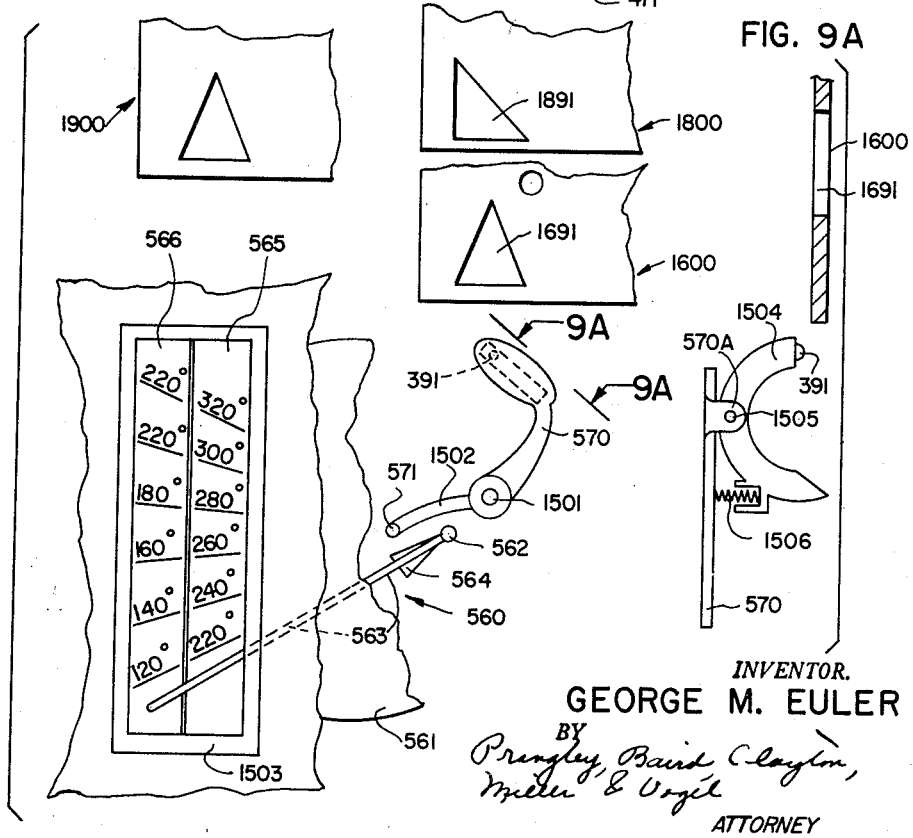
FIG. 9
FIG. 9A
INVENTOR.
GEORGE M. EULER
BY
Pringley, Baird, Clayton,
Miller & Vogel
ATTORNEY

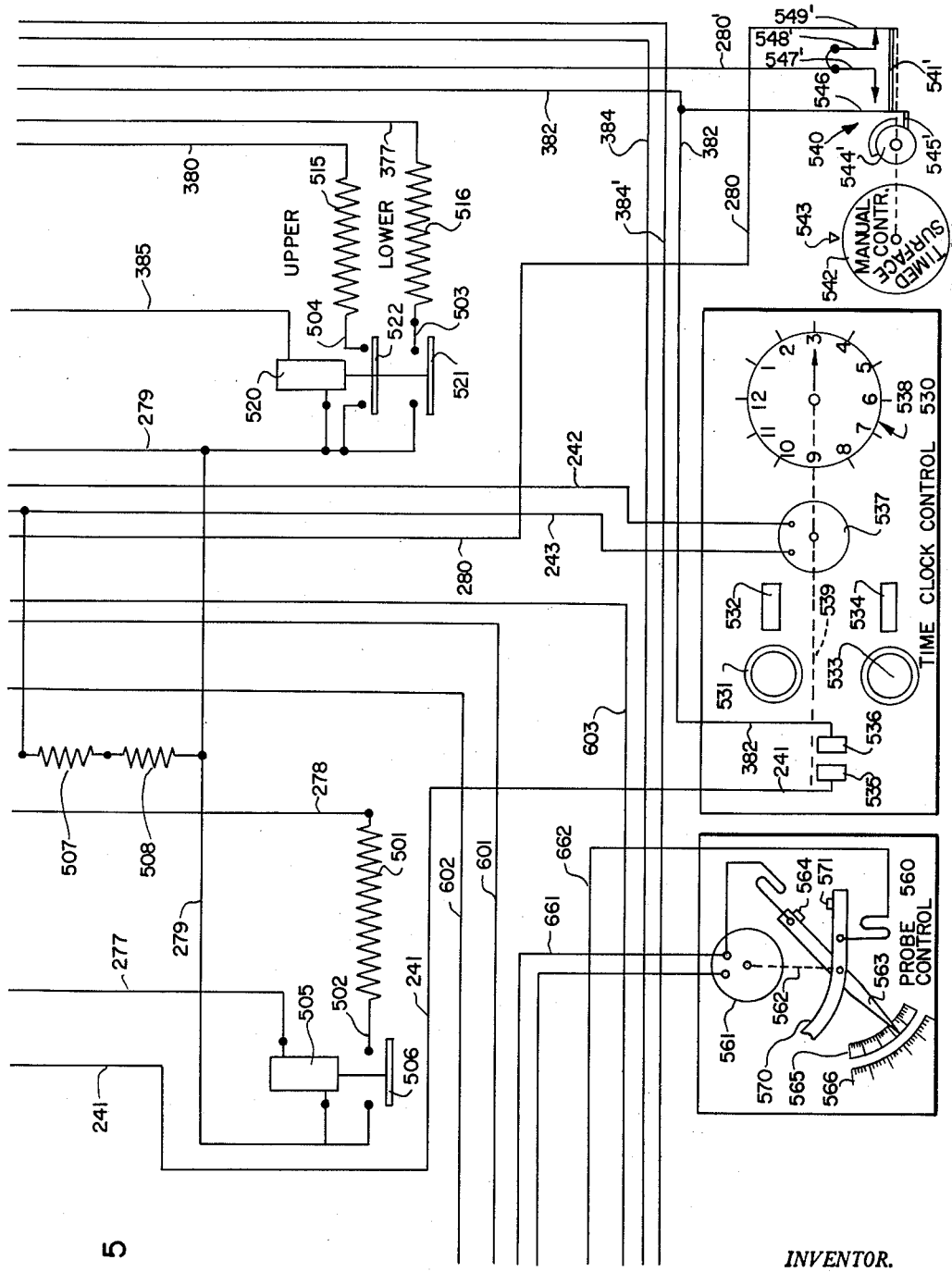

INVENTOR.
GEORGE M. EULER
ATTORNEY

Nov. 6, 1962 G. M. EULER 3,062,943
COMBINATION MANUAL AND AUTOMATIC TIME
AND TEMPERATURE CONTROL SYSTEM
Filed Aug. 11, 1961 7 Sheets-Sheet 7
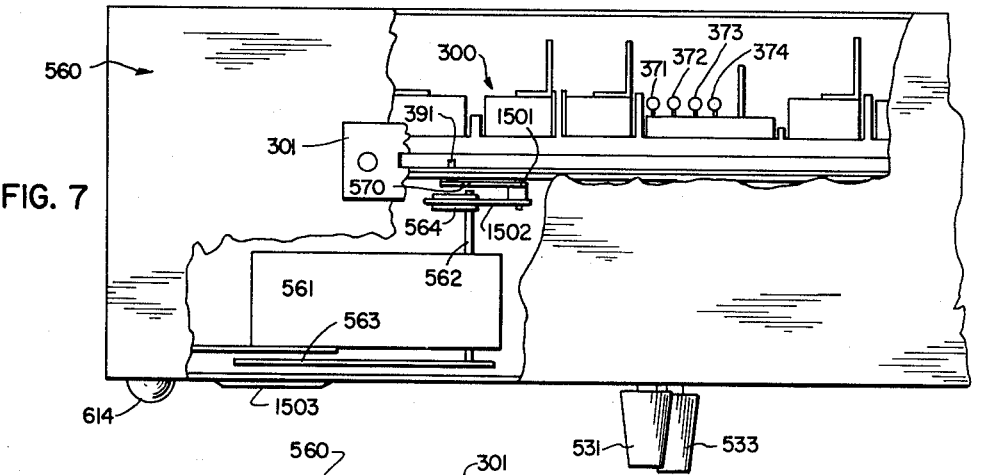
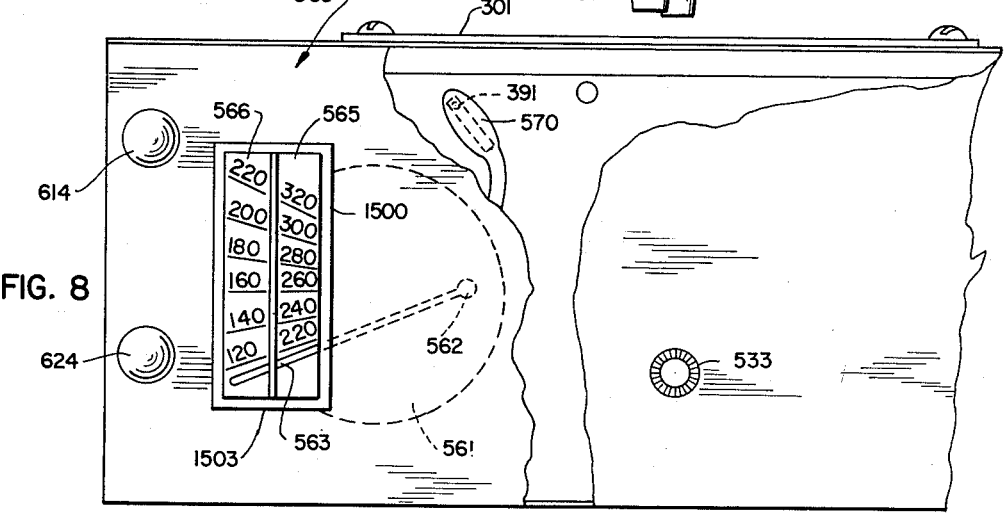
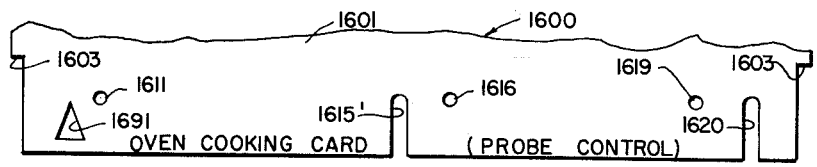
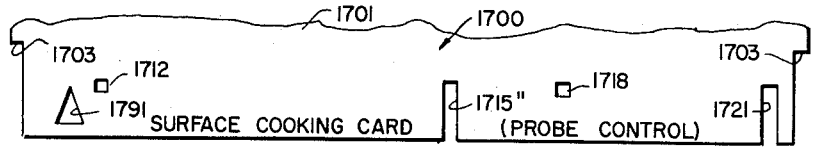
INVENTOR.
GEORGE M. EULER
BY
ATTORNEY

United States Patent Office 3,062,943
Patented Nov. 6, 1962

3,062,943
COMBINATION MANUAL AND AUTOMATIC TIME
AND TEMPERATURE CONTROL SYSTEM
George M. Euler, Normal, Ill., assignor to General Electric Company, a corporation of New York
Filed Aug. 11, 1961, Ser. No. 131,008
22 Claims. (Cl. 219—20)

The present invention relates to combination manual and automatic time and temperature control systems, and particularly to such systems for carrying out both surface unit and oven cooking operations, and more specifically to improved control systems of the character of that disclosed in the copending application of George M. Euler, Serial No. 25,784, filed April 29, 1960, now Patent No. 3,031,558, granted on April 24, 1962.

It is a general object of the invention to provide in a cooking appliances, including a surface heating unit adapted to support a cooking vessel, an improved system for controlling the supply of heat energy to the surface heating unit and comprising a temperature sensing unit arranged to sense the temperature of a cooking vessel supported by the surface heating unit, a temperature sensing probe arranged to sense the temperature of food contained in the supported cooking vessel, a first controller for selectively setting a hold temperature for the supported cooking vessel, a second controller for selectively setting a critical temperature for the food contained in the supported cooking vessel, a first control circuit governed jointly by the temperature sensing unit and by the first controller for selectively supplying heat energy to the surface heating unit so as to maintain the temperature of the supported cooking vessel substantially at the hold temperature preset by the first controller, a second control circuit governed jointly by the temperature sensing probe and by the second controller for arresting the supply of heat energy to the surface heating unit so as to prevent the temperature of the food contained in the supported cooking vessel from exceeding substantially the critical temperature preset by the second controller, a card magazine adapted selectively to receive a removable cooking card, a cooking card, and facility governed by the cooking card in the magazine for actuating at least one of the controllers to preset a corresponding temperature therein.

Another general object of the invention is to provide in a cooking appliance, including a heating unit operatively associated with an oven cavity, an improved system for controlling the supply of heat energy to the heating unit and comprising a temperature sensing unit arranged to sense the temperature of the oven cavity, a temperature sensing probe arranged to sense the temperature of food contained in the oven cavity, a first controller for selectively setting a hold temperature for the oven cavity, a second controller for selectively setting a critical temperature for the food contained in the oven cavity, a first control circuit governed jointly by the temperature sensing unit and by the first controller for selectively supplying heat energy to the heating unit so as to maintain the temperature of the oven cavity substantially at the hold temperature preset by the first controller, a second control circuit governed jointly by the temperature sensing probe and by the second controller for arresting the supply of heat energy to the heating unit so as to prevent the temperature of the food contained in the oven cavity from exceeding substantially the critical temperature preset by the second controller, a card magazine adapted selectively to receive a removable cooking card, a cooking card, and facility governed by the cooking card in the magazine for actuating at least one of the controllers to preset a corresponding temperature therein.

A further object of the invention is to provide in a cooking appliance, a control system of the character described, wherein the cooking card in the magazine actuates the first controller to preset a corresponding hold temperature.

A further object of the invention is to provide in a cooking appliance, a control system of the character described, wherein the cooking card in the magazine actuates the second controller to preset a corresponding critical temperature.

A further object of the invention is to provide in a cooking appliance, a control system of the character described, wherein the cooking card in the magazine actuates the first controller to preset a corresponding hold temperature and actuates the second controller to preset a corresponding critical temperature.

A further object of the invention is to supply in a cooking appliance having a specific cooking area, a control system comprising a manually operable control device corresponding to the cooking area and arranged respectively to control the temperatures of the cooking operations in said cooking area, a card magazine adapted selectively to receive a removable cooking card, a plurality of cooking cards corresponding to cooking area and adapted to be placed individually in the magazine, a hold temperature controller, a critical temperature controller, and facility whereby the placement in the magazine of any one of the cooking cards seizes away from the corresponding one control device the control of the cooking operation in the one cooking area and actuates at least one of the temperature controllers to preset the corresponding one of the temperatures for the cooking operation in the one cooking area.

A further object of the invention is to provide in a cooking appliance, a control system of the character described, wherein the facility is responsive to the placement in the magazine of the one cooking card for actuating both of the temperature controllers respectively to preset the hold temperature and the critical temperature for the cooking operation in the one cooking area.

Still a further object of the invention is to provide in a cooking appliance, including both a surface heating unit and an oven heating unit, a control system comprising a manually operable surface heating unit control device, clock mechanism, a manually operable master controller having first and second positions, a first control circuit responsive to operation of the master controller into its first position for preselecting the surface heating unit control device to control the supply of heat energy to the surface heating unit, and a second control circuit responsive to operation of the master controller into its second position for preselecting the clock mechanism to control the supply of heat energy to the surface heating unit.

Further features of the invention pertain to the particular arrangement of the elements of the automatic time and temperature control system, whereby the above-outlined and additional operating features thereof are attained.

The invention, both as to its organization and method of operation, together with further objects and advantages thereof, will best be understood by reference to the following specification taken in connection with the accompanying drawings, in which:

FIGURE 1 is a fragmentary front elevational view of the upper portion of an electric range, incorporating a combination manual and automatic time and temperature control system, and embodying the present invention;

FIGS. 2 to 6, inclusive, taken together, are a composite electric diagram of the control system incorporated in the electric range of FIG. 1;

FIG. 7 is an enlarged fragmentary plan view, partly broken away, of the time clock controller and the probe controller and the control card magazine that is incorporated in the automatic control system;

FIG. 8 is an enlarged fragmentary front view, partly broken away, of the apparatus, as shown in FIG. 7;

FIG. 9 is a greatly enlarged fragmentary exploded front view of the probe controller of FIGS. 10 and 11, with fragmentary elevational views of three of the cooking cards that may be employed therein, and illustrating the two scales provided in the electric temperature registering meter incorporated therein;

FIG. 9A is another greatly enlarged fragmentary exploded side view of the probe controller of FIGS. 7 and 8, as well as one of the cooking cards that may be employed therein, and illustrating the cooperation therebetween, this view being taken in the direction of the arrows along the line 9A—9A in FIG. 9.

FIG. 10 is an enlarged fragmentary front view of the lower portion of an oven cooking card (probe control) that may be employed in the automatic control system; and FIG. 11 is an enlarged fragmentary front view of the lower portion of a surface unit cooking card (probe control) that may be employed in the automatic control system.

In order to form a unified diagram of FIGS. 2 to 6, inclusive, each of the five corresponding sheets of drawings should be arranged in a horizontal position with FIGS. 2, 3 and 4 disposed in end-to-end relation in an upper row, with FIGS. 6 and 5 arranged in end-to-end relation in a lower row, and with FIGS. 6 and 5 respectively positioned below FIGS. 2 and 3.

*Section 1.—The General Arrangement of the Control System and the Electrical Connections Incorporated Therein*

Figure 1:
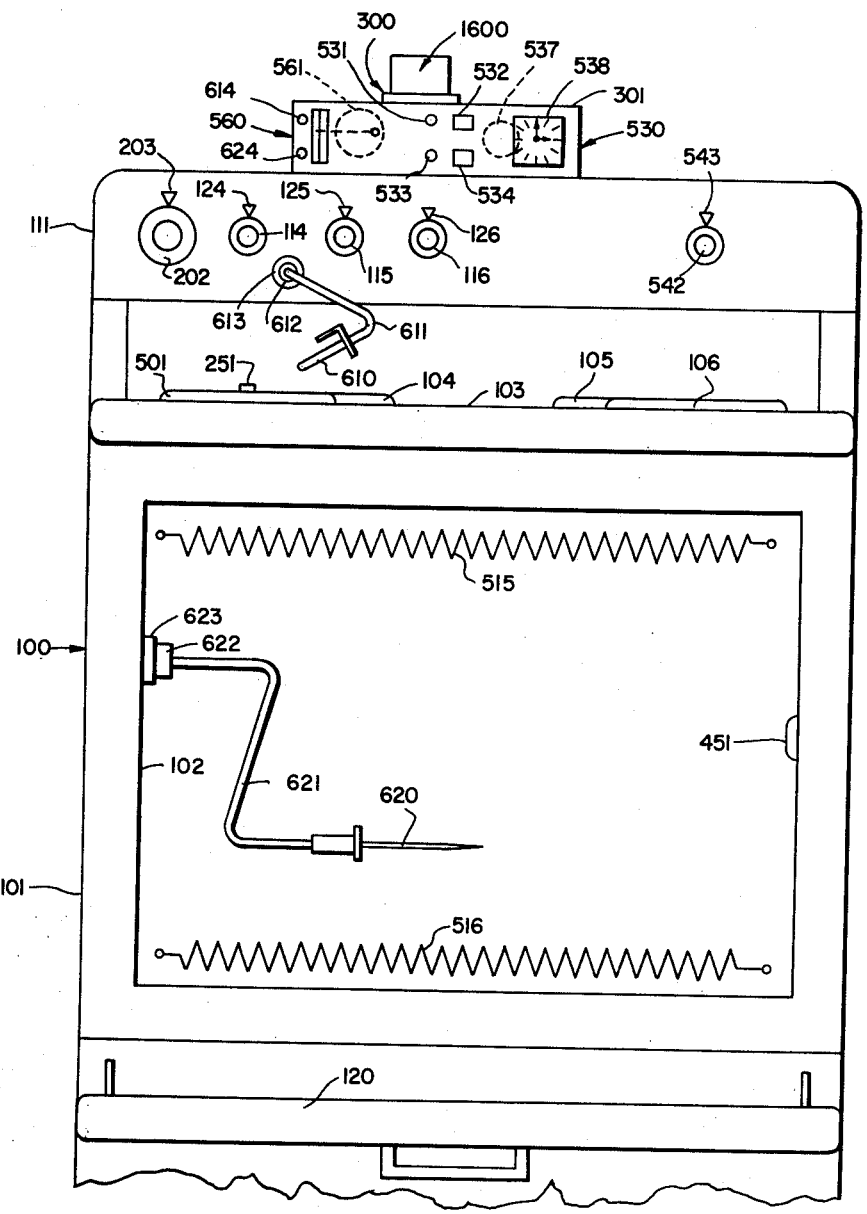

Referring now to FIG. 1 of the drawings, there is illustrated an electric cooking appliance 100, in the form of a domestic electric range, and incorporating a combination manual and automatic time and temperature control system embodying the present invention. The range comprises an upstanding body 101 having an oven cavity 102, and provided with a cooking top 103 supporting four surface heating units or hotplates 501, 104, 105 and 106 arranged in suitable spaced-apart relation.

The front door 120 of the oven is movable between closed and open positions with respect thereto, and is illustrated in its horizontal fully open position. Within the oven cavity 102 are the respective upper and lower electric heating elements 515 and 516 for baking operations.

Further, a temperature sensing probe 620 is adapted to be inserted into food contained in the oven; which probe 620 is connected via a flexible electrical cable 621 to a plug 622 that is adapted to be removably inserted into an associated socket 623 in the side wall of the oven cavity 102.

The cooking top 103 carries a backsplash 111 mounting control including the manually operable control dials or knobs 202, 114, 115 and 116. Said dials 202, 114, 115 and 116 respectively selectively control the surface units 501, 104, 105 and 106 and respectively cooperate with the associated index markers 203, 124, 125 and 126. The rotatably mounted dial 542 permits selection of a time controlled surface cooking operation or manual control thereover.

The surface unit 501 may be as disclosed in Molyneaux et al. U.S. Patent No. 2,822,455, granted February 4, 1958. Accordingly, the surface unit 501 comprises a plurality of turns or convolutions of a heating element of the metal sheath-resistance conductor type, arranged in radially spaced-apart relation and defining a cooking platform adapted to support and to heat a cooking vessel. In a centrally disposed opening of the platform there is movably mounted a temperature sensing unit 251, in the form of a thermistor, biased into cooperating relation with the bottom wall of a supported cooking vessel. The temperature sensing unit 251 utilizes thermistor material, which may consist of sintered aluminum oxide and an oxide of magnesium, manganese, titanium, iron, nickel, cobalt, zinc, etc. For example, this thermistor may have the exceedingly high negative temperature coefficient of resistance of: —0.044 ohm/ohm/° C.; whereby the characteristic thereof may be as follows.

| Temperature (° C.): | Total resistance (ohms) |
|---|---|
| 25 | 100,000 |
| 50 | 34,000 |
| 100 | 6,000 |
| 150 | 1,700 |
| 200 | 580 |

Further, a temperature sensing probe 610 is provided for insertion into food being cooked on the surface unit 501. Said probe 610 is connected via a flexible electrical cable 611 to a plug 612 that is adapted to be removably inserted into an associated socket 613 carried by the backsplash 111.

The oven probe 620 and the surface unit probe 610 may each be of the general construction and arrangement of that disclosed in U.S. Patent No. 2,657,580, granted on November 3, 1953, to George W. Schroeder; and each probe comprises a resistance element having a relatively high negative temperature coefficient of resistance.

Also, the backsplash 111 carries structure 301 incorporating in its right-hand portion a time clock controller 530 and in its left-hand portion a probe controller 560, as well as a cooking control card magazine 300. The cooking control card magazine 300 is adapted removably to receive any one of a plurality of cooking control cards, such as the indicated cooking control card 1600 later described. The time clock controller 530 may be of any conventional type, comprising a time clock proper 538 that is driven by a synchronous electric timer motor mechanism 537. Also the time clock controller 530 comprises a manually settable "time-to-cook" control knob 531 and a manually settable "stop-time" control knob 533. The control knob 533 is used to establish the clock time at which an oven cooking operation is to be terminated. This "stop-time" will appear in a cooperating window 534 provided in the front wall of the enclosing casing of the controller 530. The control knob 531 is used to establish the time interval preceding the termination clock time; whereby the control knob 531 establishes the "time-to-cook" time interval. The established "time-to-cook" time interval will appear in a cooperating window 532 provided in the front wall of said controller casing.

As is well understood in the art, the time clock controller embodies a pair of normally open contacts 535 and 536 and a bridging device 539 by means of which the clock mechanism completes the circuit across contacts 535 and 536 (schematic in FIG. 5) when the cooking operation is to begin, and interrupts the circuit to terminate the cooking operation at the time preset by the "stop-time" control knob 533. Time control mechanisms of this type derive generally from the disclosure of U.S. Patent 1,522,988, granted June 13, 1925, to Henry E. Warren.

The probe controller 560 comprises an electric meter 561 that is adapted to register temperature and including an associated needle cooperable with two scales carried by the front of the casing 301, as well as two pilot lamps 614 and 624 respectively identifying probes 610 and 620, as later explained.

Figure 2:
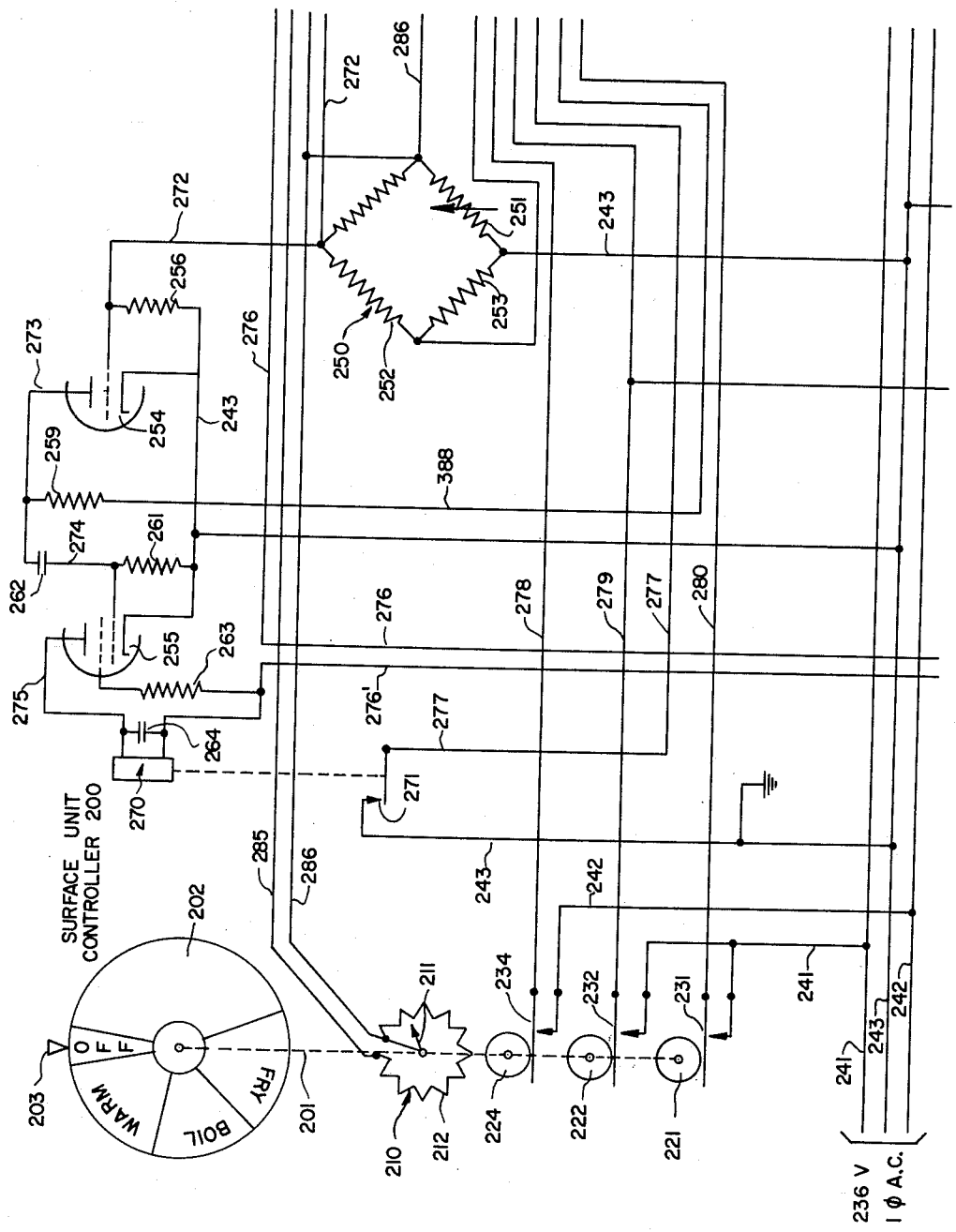
Figure 3:
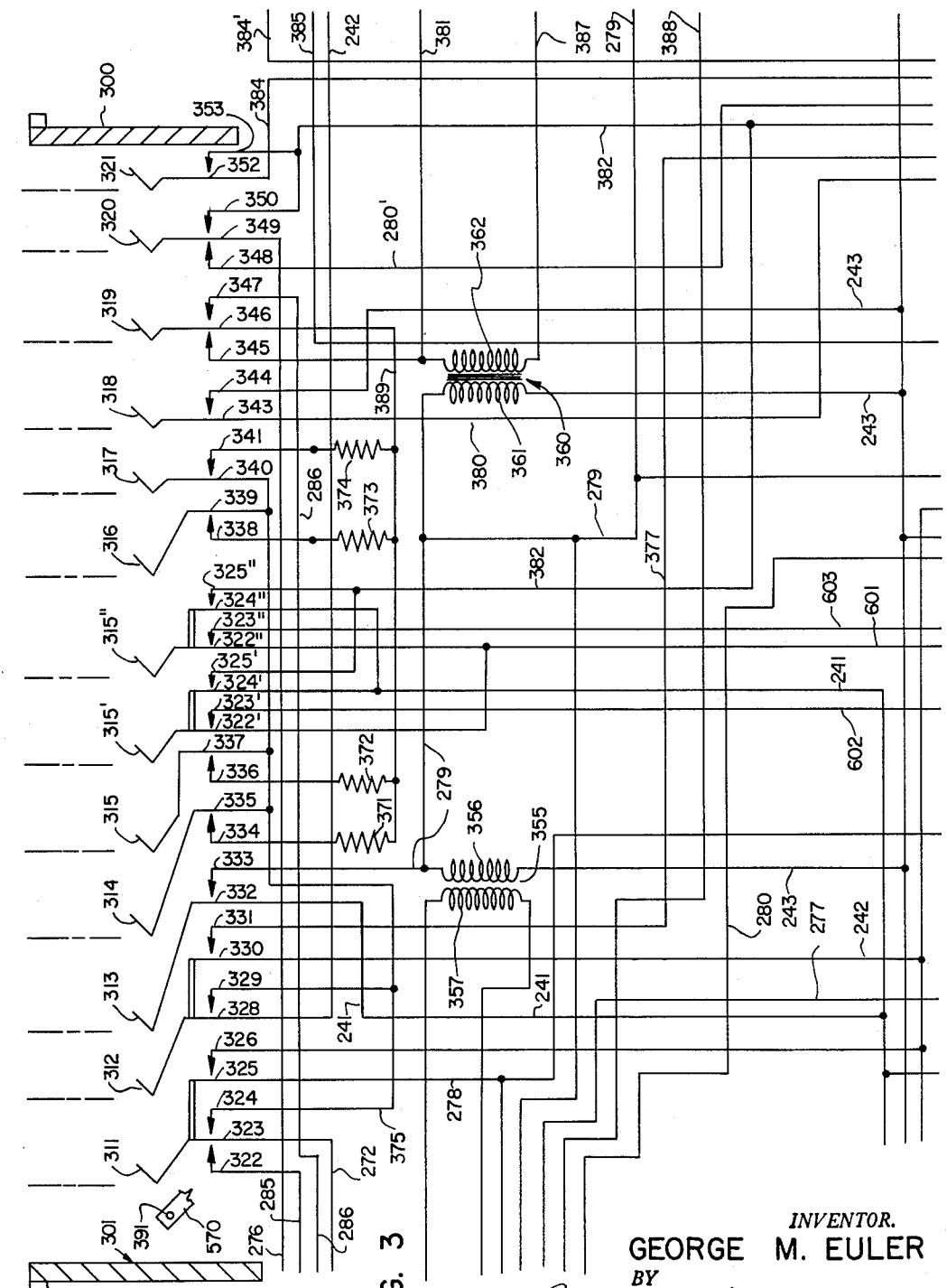
Figure 6:
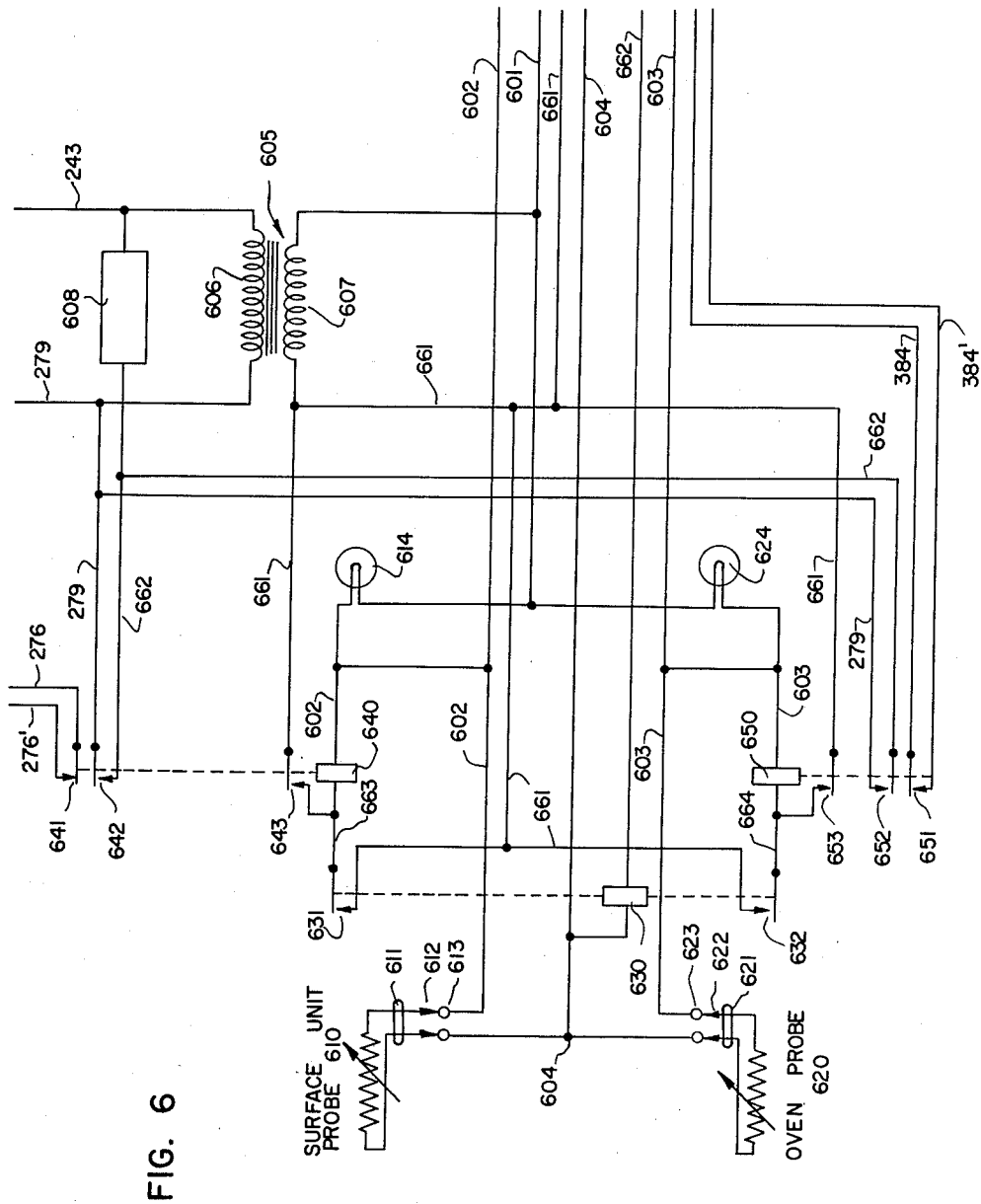

The connection and arrangement of the automatic time and temperature control system is disclosed in detail in the unified diagram comprising FIGS. 2 to 6, inclusive; and referring thereto, it will be observed that the surface unit controller 200 is shown at the left-hand side of FIG. 2, the time clock controller 530 and the probe controller 560 are schematically shown at the bottom of FIG. 5, the cooking control card magazine is shown at the top of FIG. 3, the electric heating element of the surface unit 501 and the two oven electric heating elements 515 and 516 are shown at the top of FIG. 5, and the surface unit probe 610 and the oven probe 620 are shown at the left-hand side of FIG. 6.

The surface unit controller 200 comprises a rotatable operating shaft 201 carrying the manually operable dial 202 on the outer end thereof and cooperating with the associated index marker 203; which dial 202 carries the angularly displaced indicia "off," "warm," "boil" and "fry." Shaft 201 also carries the contact arm 211 of a potentiometer 210, which includes a resistor 212. Moreover, the operating shaft 201 carries three insulating control cams 221, 222 and 224 that are respectively operatively associated with three control switches 231, 232 and 234.

The cooking control card magazine 300 comprises individual sensing elements or feelers 311, 312, 313, 314, 315, 315′, 315″, 316, 317, 318, 319, 320 and 321 that are arranged in laterally spaced-apart insulated relation with respect to each other and housed within the casing 301 of the magazine 300 and disposed below a cooperating card slot formed in the top of the casing 301; which feelers 311, etc., are adapted to sense or feel a cooperating cooking control card 1600, etc., inserted into the card slot mentioned. As presently explained, certain slots or perforations are arranged in a laterally spaced-apart array in the cooperating cooking control card that selectively cooperate with the feelers 311, etc. The feeler 311 governs two switch springs 323 and 325, the feeler 312 governs two switch springs 328 and 330, the feeler 313 governs a switch spring 332, the feeler 314 governs a switch spring 335, the feeler 315 governs a switch spring 337, the feeler 315′ governs two switch springs 322′ and 324′, the feeler 315″ governs two switch springs 322″ and 324″, the feeler 316 governs a switch spring 339, the feeler 317 governs a switch spring 340, the feeler 318 governs a switch spring 343, the feeler 319 governs a switch spring 346, the feeler 320 governs a switch spring 349, and the feeler 321 governs a switch spring 352. The switch spring 323 cooperates with a switch spring 322 and with a switch spring 324; the switch spring 325 cooperates with a switch spring 326; the switch spring 328 cooperates with a switch spring 329; the switch spring 330 cooperates with a switch spring 331; the switch spring 332 cooperates with a switch spring 333; the switch spring 335 cooperates with a switch spring 334; the switch spring 337 cooperates with a switch spring 336; the switch spring 322′ cooperates with a switch spring 323′; the switch spring 324′ cooperates with a switch spring 325′; the switch spring 322″ cooperates with a switch spring 323″; the switch spring 324″ cooperates with a switch spring 325″; the switch spring 339 cooperates with a switch spring 338; the switch spring 340 cooperates with a switch spring 341; the switch spring 343 cooperates with a switch spring 344; the switch spring 346 cooperates with a switch spring 345 and with a switch spring 347; the switch spring 349 cooperates with a switch spring 348 and with a switch spring 350; and the switch spring 352 cooperates with a switch spring 353.

Further, a slot feeler 391 (FIGS. 9 and 9A) that is carried by an associated arm 570 is provided within the casing 301 adjacent to the left-hand side wall thereof; which slot feeler 391 is adapted to cooperate with a triangular slot formed in certain of the cooking cards; whereby upon the insertion of one of the last-mentioned cooking cards the slot feeler 391 effects adjustment of the arm 570; all for a purpose more fully explained hereinafter.

Also the system comprises a surface unit Wheatstone bridge 250 (FIG. 2) incorporating as one leg thereof the surface unit thermistor 251, as well as two individual resistance legs 252 and 253. Further, the system comprises an oven Wheatstone bridge 450 (FIG. 4) incorporating as one leg thereof the oven thermistor 451, as well as two individual resistance legs 452 and 453. A common resistance leg, that is adapted variably to include any of four resistors 371, 372, 373 and 374 according to the operation of the four feelers 314, 315, 316, and 317, may be selectively inserted as the fourth leg in either of the bridges 250 or 450. Also, in the arrangement, the potentiometer 210 that may be selectively set by the surface unit controller 200 may be selectively inserted as the fourth leg in the surface unit bridge 250.

A signal amplifying system comprises a dual triode 254—454, that may be of the 12AX7-type, as well as a dual tetrode 255—455, that may be of the 50C5-type. Sections 254 and 454 of the dual triode mentioned are respectively operatively connected to the surface unit bridge 250 and to the oven bridge 450; while the sections 255 and 455 of the dual tetrode mentioned are respectively operatively connected to the two sections 254 and 454 of the dual triode mentioned. In turn, the outputs of the two sections 255 and 455 of the dual tetrode mentioned are respectively connected to two control relays 270 and 470. The relays 270 and 470 respectively govern two contactors 505 and 520; the contactor 505 governs the energization of the surface unit 501 and the contactor 520 governs the energization of the oven heating elements 515 and 516.

The surface unit bridge 250 is supplied with power from a transformer 355 having a primary winding 356 and a secondary winding 357; and similarly, the oven bridge 450 is supplied with power from a transformer 360 having a primary winding 361 and a secondary winding 362. The triode sections 254 and 454 are supplied with B+ power from a suitable silicon crystal rectifier 458, FIG. 4.

The time clock controller 530 includes contacts 535 and 536 that normally are in open circuit relationship; and following settings of the manual control knobs 531 and 533 for a time controlled cooking operation, the contacts 535 and 536 are bridged to initiate the timed cooking operation as established by the control knob 531, and the contacts 535 and 536 are again opened to terminate the timed cooking operation as established by the control knob 533.

The two probes 610 and 620 are supplied with power from a transformer 605 having a primary winding 606 and a secondary winding 607. Also, a test relay 630 is commonly associated with the two probes 610 and 620; and the two probes 610 and 620 are respectively provided with two lockout relays 640 and 650, as well as the two pilot lamps 614 and 624.

The probe controller 560, FIG. 5, comprises in addition to the electric meter 561, a pair of contacts 564 and 571 that are respectively carried by the needle 563 and by the arm 570 that is selectively adjusted by the slot feeler 391, as previously mentioned. In the arrangement, one or the other of the probes 610 or 620 may be connected to the electric meter 561 under the control of one of the cooking cards arranged in the card magazine 300; whereby the slot feeler 391 carried by the arm 570 selectively adjusts the position of the arm 570 and consequently the contact 571 as dictated by the slot in the cooking control card; and ultimately the registration of the meter 561 is sufficiently high to cause the needle 563 to move the contact 564 into engagement with the contact 571 indicating that a match is achieved between the temperature of the food operatively associated with the effective one of the probes 610 or 620 and the registration of the meter 561.

The control system comprises a source of power supply of the 3-wire Edison type, 236-volts, single-phase, 60-cycles A.C., including two outside line conductors 241 and 242 and the grounded neutral conductor 243. In the power amplifier network, the triode section 254 includes an anode connected to a conductor 273, a cathode connected to the neutral conductor 243, and a control grid connected to the conductor 272; and a grid resistor 256 is connected between the conductor 272 and the neutral conductor 243. The tetrode section 255 includes an anode connected to a conductor 275, a cathode connected to the neutral conductor 243, a control grid connected to a conductor 274, and a screen grid connected via a grid resistor 263 to the conductor 276'; and a grid resistor 261 is connected between the conductor 274 and the neutral conductor 243. The control relay 270 includes a winding that is connected between the conductors 275 and 276'; and also a filtering capacitor 264 is bridged across the conductors 275 and 276'. Further, the conductors 273 and 274 are coupled by a capacitor 262; and the B+ conductor 388 is connected via a limiting resistor 259 to the conductor 273.

The triode section 454 includes an anode connected to a conductor 473, a cathode connected to the neutral conductor 243, and a control grid connected to the conductor 472; and a grid resistor 456 is connected between the conductor 472 and the neutral conductor 243. The tetrode section 455 includes an anode connected to a conductor 475, a cathode connected to the neutral conductor 243, a control grid connected to a conductor 474, and a screen grid connected via a grid resistor 463 to the conductor 384'; and a grid resistor 461 is connected between the conductor 474 and the neutral conductor 243. The control relay 470 includes a winding that is connected between the conductors 475 and 384'; and also a filtering capacitor 464 is bridged across the conductors 475 and 384'; and further, the conductors 473 and 474 are coupled by a capacitor 462, and the B+ conductor 388 is connected via a limiting resistor 459 to the conductor 473. The conductor 279 is connected via a limiting resistor 457 to one terminal of the crystal rectifier 458 and the other terminal thereof is connected to the B+ conductor 388. The cathodes of the four tube sections 254, 454, 255 and 455 are heated by an associated heater 507 (FIG. 5) that is connected in series relation with a limiting resistor 508 across the conductor 279 and the neutral conductor 243. The control relay 270 is provided with a pair of contacts 271 that respectively terminate a conductor 277 and the neutral conductor 243; and similarly, the control relay 470 is provided with a pair of contacts 471 that respectively terminate a conductor 385 and the neutral conductor 243.

The winding of the contactor 505 is bridged across the conductors 277 and 279; and the winding of the contactor 520 is bridged across the conductors 385 and 279. The surface heating unit 501 is connected to the conductor 278 and a conductor 502; the oven lower heating unit 516 is bridged across the conductor 377 and a conductor 503; and the oven upper heating unit 515 is bridged across the conductor 380 and a conductor 504. The contact bridging member 506 of the contactor 505 is provided with a pair of contacts respectively terminating the conductors 279 and 502. The contact bridging member 521 of the contactor 520 controls a pair of front contacts respectively terminating the conductors 279 and 503; and the contact bridging member 522 of the contactor 520 controls a pair of front contacts respectively terminating the conductors 279 and 504.

*Section 2.—The Cooking Control Cards That Are Employed in the Automatic Control System*

Automatic temperature and probe control of a cooking operation in the oven cavity 102 may be governed by the insertion of the oven cooking card 1600 of FIG. 10 into the card slot provided in the top of the cooking control card magazine 300, as shown at the top of FIG. 3; which oven cooking card 1600 essentially comprises a rectangular body 1601 formed of electrical insulating material such as a textile reinforced phenolformaldehyde resin sheet. Control card 1600 incorporates the triangular slot 1691 adjacent to the left-hand side thereof that cooperates with the probe controller 560. Specifically, the body 1601 of the card 1600 carries the two circular apertures 1611 and 1616 and the two elongated slots 1615' and 1620 that cooperate with the corresponding feelers 311, etc., incorporated in the card magazine 300. The opposite sides of the body 1601 have shoulders 1603 for limiting the insertion of the card 1600 into the card magazine 300.

When the oven control card 1600 is thus inserted into the card slot provided in the top of the card magazine 300, certain of the switch springs, such as springs 315", are actuated to effect operation of the set of switch springs 322" so as to energize the oven probe 620. Moreover, this insertion of the oven cooking card 1600 into the card slot provided in the card magazine 300 causes the triangular slot 1691 provided in the body 1601 thereof to cooperate with the slot feeler 391, whereby the arm 570 incorporated in the probe controller 560 is adjusted to preset a critical temperature therein for a purpose later explained.

Automatic temperature and probe control of a cooking operation in a cooking vessel supported by the surface unit 501 may be governed by the insertion of the surface cooking card 1700 of FIG. 11 into the card slot provided in the top of the cooking control card magazine 300, as shown at the top of FIG. 3; which cooking card 1700 essentially comprises a rectangular body 1701, incorporating the triangular slot 1791 adjacent to the left-hand side thereof that cooperates with the probe controller 560. Specifically, the body 1701 of the card 1700 carries the two square apertures 1712 and 1718 and the two elongated slots 1715" and 1721 that cooperate with the corresponding feelers 312, etc., incorporated in the card magazine 300. The opposite sides of the body 1701 carry the shoulders 1703 for limiting the insertion of the card 1700 into the card magazine 300.

When the surface cooking card 1700 is thus inserted into the card slot, the switch springs 311, etc., are actuated in order to disable the manually operable surface unit controller 200 and to effect operation of the set of switch springs 315' so as to energize the surface unit probe 610. Moreover, this insertion of the surface cooking card 1700 causes the triangular slot 1791 provided in the body 1701 thereof to cooperate with the slot feeler 391, whereby the arm 570 incorporated in the probe controller 560 is adjusted to preset a critical temperature therein, as later explained.

*Section 3.—The Mechanical Construction and Arrangement of the Probe Controller 560 and of the Cooking Control Magazine 300*

For the mechanical construction and arrangement of the probe controller 560 and of the cooking control card magazine 300, reference is made to FIGS. 7, 8 and 9. The electric meter 561 is of the current-responsive type, and is provided with a rotatably mounted arbor 562, the outer end of which carries the needle 563 visible through a window mounted in a frame 1503 in the front wall of the housing 301. The window carries two scales 565 and 566 of indicia cooperating with the needle 563. The scale 566 corresponds to the oven probe 620 and is calibrated over the temperature range 120° F. to 220° F.; while the scale 565 corresponds to the surface unit probe 610 and is calibrated over the temperature range 220° F. to 320° F.

The upper end of the arm 570 carries the slot feeler 391 positioned below the top of the casing 301 and adjacent to the left-hand end of the card slot provided therein, as best shown in FIGS. 3, 7 and 8. The lower end of the arm 570 is rotatably mounted upon a pin 1501, as best shown in FIGS. 7 and 9; and also the inner end of an arm 1502 is rotatably mounted upon the pin 1501 in frictional engagement with the lower end of the arm 570.

3,062,943

9

The outer end of the arm 1502 carries the electric contact 571 that cooperates with the electric contact 564 that is carried by the inner end of the arbor 562.

When one of the cooking cards 1600, 1800, etc., is inserted into the card slot in the top wall of the casing 301, the triangular slot 1691, 1891, etc., therein engages the slot feeler 391 carried by the arm 570, whereby the arm 570 is rotated in one direction or the other about the pin 1501, depending upon the position of the apex of the triangular slot 1691, 1891, etc., provided in the card. This rotation of the arm 570 about the pin 1501 is frictionally imparted to the arm 1502, whereby the arm 1502 is rotated about the pin 1501 with the arm 570, so as correspondingly to adjust the position of the electric contact 571, and thus to preset a corresponding critical temperature into the probe controller 560.

Subsequently, in the automatic cooking cycle, the temperature of the food is elevated, whereby the connected one of the probes 620 or 610 causes the meter 561 to register a higher temperature with the result that the arbor 562 is rotated in the clockwise direction, as viewed in FIG. 9, carrying with it the needle 563, and also the electric contact 564, so that the contact 564 is moved toward the contact 571 as the temperature sensed by the probe 620 or 610 connected to the meter 561 rises.

Ultimately, the temperature registration of the meter 561 matches the critical temperature preset in the probe controller 560, whereby the contact 564 engages the contact 571 so as to effect operation of the test relay 630, with the result that the automatic cooking cycle in progress is terminated, as explained more fully hereinafter.

Reviewing the construction of the probe controller 560, it is noted that the resistance characteristics of the two probes 620 and 610 are matched against the electrical characteristic of the meter 561 so as to render the two scales 566 and 565 directly readable in terms of ° F. Also, it is noted that the frictional engagement between the lower end of the arm 570 and the inner end of the arm 1502 accommodates relative movement therebetween, as a factory adjustment, for the purpose of calibrating the position of the arm 1502 relative to the needle 563 and with relation to the scales 566 and 565. Further, it is noted that the setting of the arm 570 in the clockwise direction, as viewed in FIG. 9, is effective to set a higher critical temperature into the probe controller 560, since this rotation of the arm 570 causes rotation of the contact 571 in the clockwise direction, as viewed in FIG. 15, away from the contact 564. Accordingly, the cooking card 1600 presets a relatively low critical temperature into the probe controller 560, while the cooking card 1800 presets a relatively high critical temperature into the probe controller 570.

The constructional detail of the slot feeler 391 incorporated in the probe controller 560 is best illustrated in FIG. 9A, wherein it will be observed that the slot feeler 391 is carried upon the upper end of a rocker 1504 that is pivoted adjacent to the intermediate portion thereof to a tab 570A carried upon the outer end of the arm 570 by a pivot pin 1505. The rocker 1504 is normally biased in the counterclockwise direction about the pivot pin 1505, as viewed in FIG. 9A, by a compression spring 1506 arranged between the lower end of the rocker 1504 and the adjacent portion of the arm 570. In the arrangement, when the cooking card 1600 is inserted into the card slot provided in the top of the cooking card control magazine 300, the bottom of the card 1600 passes the slot feeler 391 in its downward movement and then engages the lower end of the rocker 1504, thereby pivoting the rocker 1504 in the clockwise direction about the pivot pin 1505; whereby the slot feeler 391 is moved in the clockwise direction so that its falls into the triangular slot 1691 provided in the body of the card 1600 for the guide purpose, as previously explained. Subsequently, when the card 1600 is removed from the cooking card control magazine

10

300, the bottom thereof rides off of the lower end of the rocker 1504 in the upward movement of the card 1600, so that the compression spring 1506 rotates the rocker 1504 in the counterclockwise direction about the pivot pin 1505 so as to remove the slot feeler 391 from the triangular slot 1691 provided in the body of the card 1600. This arrangement prevents hanging of the card 1600 with respect to the slot feeler 391 incident to removal of the card 1600 from the card slot control magazine 300.

*Section 4.—Automatic Operation of the Surface Heating Unit 501 Under the Joint Control of the Cooking Card Control Magazine 300 and of the Probe Controller 560*

In order to carry out a cooking operation involving the surface heating unit 501 under the joint control of the cooking card control magazine 300 and of the probe controller 560, it is first necessary for the cook to select the surface cooking card corresponding to the desired cooking operation. Consideration in this selection, is the determination of the critical temperature at which the cooking operation is to be terminated as sensed by the surface unit probe 610, and it may be assumed that the cook selects the surface cooking card 1700 that sets a corresponding critical temperature, such, for example, as 280° F., as the temperature at which the cooking operation is to be terminated. The surface cooking card 1700 of FIG. 11 is inserted into the card slot provided in the top of the casing 301 of the magazine 300 and is positioned downwardly into its home position therein, as established by the engagements of the shoulders 1703 provided on the opposite side edges of the card 1700 and the abutments provided at the opposite sides of the casing 301. This insertion of the card 1700 into the magazine 300 causes the triangular slot 1791 to cooperate with the slot feeler 391 carried by the arm 570 incorporated in the probe controller 560; whereby the corresponding critical temperature of 280° F. mentioned is thus preset or registered in the probe controller 560.

Furthermore, when the card 1700 is inserted into the magazine 300, the rectangular holes or opertures 1712, etc., respectively cooperate with the feelers 312, etc., incorporated in the magazine 300. Certain of the feelers are not actuated away from their normal positions, as illustrated in FIG. 3, since the apertures 1712, etc., in the card 1700 constitute cut-outs therein. On the other hand, the solid portions of the card 1700 actuate the remainder of the feelers to effect corresponding switching operations therein in the circuit network. Therefore, when the card 1700 is inserted into the magazine 300, the various feelers are actuated to establish the switch springs in the following positions.

| Switch springs | Condition |
|---|---|
| 323—322 | (open) O |
| 323—324 | (closed) X |
| 325—326 | X |
| 328—329 | O |
| 330—331 | O |
| 332—333 | X |
| 335—334 | O |
| 337—336 | O |
| 339—338 | O |
| 340—341 | X |
| 343—344 | O |
| 346—345 | O |
| 346—347 | X |
| 349—348 | O |
| 349—350 | X |
| 352—353 | O |
| 322'—323' | X |
| 324'—325' | X |
| 322"—323" | O |
| 324"—325" | O |

Closure of the springs 332—333 connects the line conductor 241 to the conductor 279, thereby to energize the primary winding 356 of the transformer 355, so as to condition the bridge 250 for subsequent operation. Also, the connection of power to the conductor 279 rrenders the crystal rectifier 458 operative to supply B+ potential to the conductor 388 extending to the anode of the triode section 254. Closure of the switch springs 323—324 connects the conductor 272 to the conductor 375; while the combination of the opening of the switch springs 335—334, the opening of the switch springs 337—336, the opening of the switch springs 339—338 and the closing of the switch springs 340—341, connects the conductor 375 via the resistor 374 to the conductor 389; while the closure of the switch springs 346—347 connects the conductor 389 to the conductor 286. Accordingly, at this time, the conductors 272 and 286 that extend to the input terminals of the bridge 250 are connected together via the resistor 374; whereby this arrangement presets the hold temperature that the thermistor 251 must subsequently match in the subsequent operation of the bridge 250. Also, in passing, it is mentioned that the opening of the switch springs 323—322 disables the potentiometer 210 so as to prevent the connection thereof across the input terminals of the bridge 250.

In view of the foregoing, it will be appreciated that the insertion of the surface cooking card 1700 into the magazine 300 not only registers the critical temperature of 280° F. in the probe controller 560, but also presets the hold temperature that is subsequently to be maintained at the bottom of the cooking vessel, as sensed by the thermistor 251, this presetting of the hold temperature mentioned being enforced by the connection, in the present example, of the resistor 374 across the conductors 272 and 286 extending to the input terminals of the bridge 250, as previously explained. This preset hold temperature may be, for example, 350° F.; and in any case the hold temperature that is preset into the circuit network by the insertion of the surface cooking card 1700 into the card magazine 300 is higher than the critical temperature that is registered thereby into the probe controller 560.

Continuing with the cooking operation, it is assumed that a vessel containing a food to be cooked is supported upon the surface heating unit 501, that the bottom of the cooking vessel, is cold, and that, accordingly, the thermistor 251 arranged in contact with the bottom of the cooking vessel mentioned senses the cold temperature. Also, it is assumed that the food contained in the cooking vessel mentioned is cold and that the surface unit probe 610 is in temperature sensing relation with respect to the food contained therein.

Also, the connection of power to the conductor 279 completes an obvious circuit for energizing the primary winding 606 of the transformer 605, the primary winding 606 being bridged between the conductor 279 and the grounded neutral conductor 243, whereby an appropriate alternating voltage is induced into the secondary winding 607 of the transformer 605. Closure of the switch springs 322'—323' connects the conductor 601 to the conductor 602, thereby supplying power to the surface unit probe 610 and the electric meter 561 in series relation. More particularly, the right-hand terminal of the secondary winding 607 is connected to the conductor 601 that extends via the closed contacts 322'—323' to the conductor 602 that is terminated by one of the contacts in the socket 613; while the left-hand terminal of the secondary winding 607 is connected to the conductor 661 and extends via the winding of the electric meter 561 to the conductor 604 that is terminated by the other contact in the socket 613. At this time, it is assumed that the plug 612 terminating the cable 611 extending to the surface unit probe 610 is in the socket 613, thereby to complete the above-mentioned series circuit for energizing the winding of the meter 561 and the surface unit probe 610 across the secondary winding 607 of the transformer 605. At this time, the resistance of the cold surface unit probe 610 is very high, whereby the electric meter 561 registers the corresponding low temperature by virtue of the cooperation of the needle 563 with the scale 565. The pilot lamp 614 is illuminated, since it is bridged directly across the conductors 601 and 602, thereby to indicate to the cook that the scale 565 of the electric meter 561 should be read, since it is the surface unit probe 610 that is operatively connected to the electric meter 561.

Also, the closure of the contacts 324'—325' connects the line conductor 241 to the conductor 382, which connection is extended via the closed switch springs 350—349 to the conductor 276 and therefrom via the closed contacts 641 to the conductor 276' and thence to one terminal of the winding of the relay 270. At this time, since the thermistor 251 is cold, the resistance thereof is exceedingly high, with the result that the bridge 250 is severely unbalanced, thereby applying via the conductor 272 a large bias to the grid of the triode section 254, with the result that the triode section 254 is rendered non-conductive; whereby the bias applied via the capacitor 262 to the conductor 274 and thence to the control grid of the tetrode section 255 is small rendering the tetrode section 255 conductive. Accordingly, the relay 270 is energized via the tetrode section 255, with the result that it operates closing its contacts 271 to complete the circuit for operating the contactor 505, whereby the contactor 505 connects at its contact bridging member 506 and its front contacts the surface heating unit 501 across the conductors 278 and 279. At this time, the conductor 279 is connected via the previously traced circuit to the line conductor 241 and the conductor 278 is connected via the closed switch springs 325—326 to the line conductor 242; whereby the surface heating unit 501 is energized across the supply conductors 241 and 242 at 236 volts, with the result that the temperature thereof rapidly rises effecting corresponding heating of the bottom of the supported cooking vessel; whereby the temperature of the thermistor 251 increases and its resistance decreases in proportion to the increase in the temperature thereof, as previously explained. The balance of the bridge 250 is thereby improved, with the result that the bias applied therefrom to the conductor 272 and thus to the control grid of the triode section 254 is reduced. When the temperature sensed by the thermistor 251 matches the hold temperature set by the surface cooking card 1700 in the magazine 300 (the resistance of the thermistor 251 substantially matching that of the resistor 374), the bridge 250 is substantially balanced; whereby the bias applied to the conductor 272 and thence to the control grid of the triode section 254 is substantially removed; whereby the triode section 254 is rendered conductive, with the result that the bias applied via the conductor 273 and the capacitor 272 is increased; whereby this bias applied via the conductor 274 to the control grid of the tetrode section 255 drives the tetrode section 255 substantially to cut-off, with the result that the current traversing the winding of the relay 270 is reduced effectively to bring about the restoration of the relay 270. Upon restoring the relay 270 opens its contacts 271 bringing about the restoration of the contactor 505 and the consequent de-energization of the surface heating unit 501. Thereafter, the temperature of the thermistor 251 subsides, with the result that the resistance thereof is increased in order to again to bring about a resistance mismatch with the resistor 374 and the resulting unbalancing of the bridge 250; whereby the relay 270 is reoperated effecting reoperation of the contactor 505 and the resulting re-energization of the surface heating unit 501.

Accordingly, the thermistor 251 senses the temperature of the bottom of the cooking vessel and cooperates with the resistance of the preselected resistor 374 in order variably to maintain the balance of the bridge 250, with the result that the amplifier sections 254 and 255 are controlled so as selectively to operate and to restore the relay 270. The contactor 505 is thus selectively operated and restored in order to complete and to interrupt the circuit for energizing the surface heating unit 501. The supply of heat energy to the surface heating unit 501 is thus modulated to maintain the temperature of the bottom of the supported cooking vessel mentioned substantially at the hold temperature of 350° F., as preset by the surface cooking card 1700 in its inserted position in the magazine 300.

As the cooking operation continues, the temperature of the food contained in the cooking vessel supported by the surface unit 501 rises; whereby the temperature of the surface unit probe 610 is correspondingly increased, resulting in the corresponding decrease of the resistance thereof, so that the meter 561 registers a corresponding increase in the temperature sensed by the surface unit probe 610, as indicated by the cooperation between the needle 563 and the cooperating scale 565. Ultimately when the registration of the meter 561 matches the critical temperature of 280° F. previously registered in the probe controller 560 by the surface cooking card 1700 in its inserted position in the card magazine 300, the electric contact 564 engages the electric contact 571, thereby to complete a circuit for energizing the winding of the test relay 630. More specifically, the winding of the test relay 630 is bridged across the conductors 604 and 661, the path including the conductor 662 and the closed contacts 571—564; whereby the winding of the test relay 630 is energized causing the latter relay to operate. Upon operating the test relay 630 prepared at the contacts 632 a circuit for operating the lockout relay 650; however, without effect in the present example, since it is not the oven probe 620 that is being utilized in the present cooking operation. Also the test relay 630 completes at the contacts 631 a circuit for energizing the winding of the lockout relay 640 across the secondary winding 607 of the transformer 605, this circuit including the conductor 661, the closed contact 631, the winding of the lockout relay 640, the conductor 602, the closed contacts 323'—322' and the conductor 601. Accordingly, the lockout relay 640 operates to complete, at the contacts 643, a locking circuit for energizing the winding thereof independent of the position of the test relay 630, the locking circuit mentioned including the conductor 661, the closed contact 643, the winding of the lockout relay 640, the conductor 602, the closed contact 323'—322' and the conductor 601. Also, the lockout relay 640 completes, at the contact 642, a connection between the conductors 279 and 662, whereby the audible signal or buzzer 608 indicates to the cook that the cooking operation has been terminated.

Finally, the lockout relay 640 interrupts at the contacts 641, the normal connection between the conductors 276 and 276', thereby to insure the restoration of the relay 270 and the consequent restoration of the contactor 505, with the result that the surface heating unit 501 is deenergized. Accordingly, at this time, the cooking operation involving the surface heating unit 501 is terminated.

In order to restore the control of the surface heating unit 501 to the manually operable surface unit controller 200, it is only necessary for the cook to remove the card 1700 from the magazine 300; whereby, at this time, the feelers 311, etc., incorporated in the magazine 300 are returned into their normal positions, as illustrated in FIG. 3. At this time, the opening of the switch springs 322'—323' interrutps the holding circuit for retaining operated the lockout relay 640, whereby the latter relay restores to interrupt at the contacts 642 the circuit for operating the audible signal or buzzer 608. Also, upon restoring the lockout relay 640 reconnects at the contacts 641 the conductors 276 and 276', thereby again to restore the control of the surface heating unit 501 to the manually operable surface unit controller 200.

*Section 5.—An Automatic Baking Operation in the Oven Cavity 102 Under the Joint Control of the Cooking Card Control Magazine 300 and of the Probe Controller 560*

In order to carry out a cooking operation in the oven cavity 102 under the joint control of the cooking card control magazine 300 and of the probe controller 560, it is first necessary for the cook to select the oven cooking card corresponding to the desired cooking operation and then to insert the same into the card slot provided in the top of the cooking control card magazine 300. The primary consideration in this selection of the oven cooking card is the determination of the critical temperature at which the cooking operation is to be terminated as sensed by the oven probe 620, and it may be assumed that the cook selects the oven cooking card 1600 that sets a corresponding critical temperature, such, for example, as 180° F. The oven cooking card 1600 of FIG. 10 is inserted into the card slot provided in the top of the casing 301 of the magazine 300 and is positioned downwardly into its home position therein, as established by the shoulders 1603. This insertion of the card 1600 into the magazine 300 causes the triangular slot 1691 provided in the body 1601 thereof to cooperate with the slot feeler 391 carried by the arm 570 incorporated in the probe controller 560; whereby the corresponding critical temperature of 180° F. mentioned is thus preset or registered in the probe controller 560, all in the manner previously explained in Section 4.

Furthermore, when the card 1600 is inserted into the magazine 300, the circular holes or apertures 1611, etc., respectively cooperate with the feelers 311, etc., incorporated in the magazine 300. More particularly, at this time, when the card 1600 is inserted into the magazine 300, the various feelers are actuated to establish the sets of switch springs in the following positions.

| Switch springs | Condition |
| --- | --- |
| 323—322 | X (closed) |
| 323—324 | O (open) |
| 325—326 | O |
| 328—329 | X |
| 330—331 | X |
| 332—333 | X |
| 335—334 | O |
| 337—336 | O |
| 339—338 | X |
| 340—341 | X |
| 343—344 | X |
| 346—345 | X |
| 346—347 | O |
| 349—348 | X |
| 349—350 | O |
| 352—353 | X |
| 322'—323' | O |
| 324'—325' | O |
| 322"—323" | X |
| 324"—325" | X |

Closure of the springs 332—333 connects the line conductor 241 to the conductor 279, thereby to energize the primary winding 361 of the transformer 360 so as to condition the bridge 450 for subsequent operation. Also the connection of power to the conductor 279 renders the crystal rectifier 458 operative to supply B+ potential to the conductor 473 extending to the anode of the triode section 454. Closure of the springs 328—329 connects the conductor 472 to the conductor 375; while the combination of the opening of the switch springs 335—334, the opening of the switch springs 337—336, the closed switch springs 339—338 and the closing of the switch springs 340—341, connects the conductor 375 via the resistors 373 and 374 in parallel relation to the conductor 389; while the closed switch springs 346—345 connects the conductor 389 to the conductor 381. Accordingly, at this time, the conductors 472 and 381 that extend to the input terminals of the bridge 450 are connected together via the resistors 373 and 374 in parallel relation; whereby this arrangement presets the hold temperature that the thermistor 451 must subsequently match in the subsequent operation of the bridge 450.

In view of the foregoing it will be appreciated that the insertion of the oven cooking card 1600 into the magazine 300 not only registers the critical temperature of 180° F. in the probe controller 560, but also presets the hold temperature that is subsequently to be maintained in the oven cavity as sensed by the thermistor 451, this presetting of the hold temperature mentioned being enforced by the connection, in the present example, of the resistors 373 and 374 in parallel relation across the conductors 472 and 381 extending to the input terminals of the bridge 450 as previously explained. This preset hold temperature may be, for example, 450° F.; and in any case the hold temperature that is preset into the circuit network by the insertion of the oven cooking card 1600 into the card magazine 300 is higher than the critical temperature that is registered thereby into the probe controller 560.

Continuing with the cooking operation, it is assumed that the food to be cooked in the oven cavity 102 with the door 120 in its closed position, that the oven cavity 102 is cold, and that, accordingly, the thermistor 451 arranged in heat-exchange relation with the oven cavity 102 senses the cold temperature. Also it is assumed that the food in the oven cavity 102 is cold and that the inserted oven probe 620 senses the cold temperature of the food.

Also the connection of power to the conductor 279 completes an obvious circuit for energizing the primary winding 606 of the transformer 605, the primary winding 606 being bridged between the conductor 279 and the grounded neutral conductor 243, whereby an appropriate alternating voltage is induced into the secondary winding 607 of the transformer 605. Closure of the switch springs 322"—323" connects the conductor 601 to the conductor 603, thereby supplying power to the oven probe 620 and the electric meter 561 in series relation. More particularly, the right-hand terminal of the secondary winding 607 is connected to the conductor 601 that extends via the closed contacts 322"—323" to the conductor 603 that is terminated by one of the contacts in the socket 623; while the left-hand terminal of the secondary winding 607 is connected to the conductor 661 and extends via the winding of the electric meter 561 to the conductor 604 that is terminated by the other contact in the socket 623. At this time, it is assumed that the plug 622 terminating the cable 621 extending to the oven probe 620 occupies its inserted position with respect to the socket 623, thereby to complete the above-mentioned series circuit for energizing the winding of the meter 561 and the oven probe 620 across the secondary winding 607 of the transformer 605. At this time, the resistance of the oven probe 620 is very high, by virtue of the fact that it senses the cold temperature of the food contained in the oven cavity 102, whereby the electric meter 561 registers the corresponding low temperature by virtue of the cooperation of the needle 563 with the scale 566. Also it is time, the pilot lamp 624 is illuminated, since it is bridged directly across the conductors 601 and 603, thereby to indicate to the cook that the scale 566 of the electric meter 561 should be ready, since it is the oven probe 620 that is operatively connected to the electric meter 561. Also the closure of the contacts 324"—325" connects the line conductor 241 to the conductor 382, which connection is extended via the closed switch springs 353—352 to the conductor 384 and therefrom via the closed contacts 651 to the conductor 384' and thence to one terminal of the winding of the relay 470. At this time, since the thermistor 451 is cold, the resistance thereof is exceedingly high, with the result that the bridge 450 is severely unbalanced, thereby applying via the conductor 472 a large bias into the grid of the triode section 454, with the result that the triode section 454 is rendered non-conductive; whereby the bias applied via the capacitor 462 to the conductor 474 and thence to the control grid of the tetrode section 455 is small rendering the tetrode section 455 conductive. Accordingly, the relay 470 is energized via the tetrode section 455, with the result that it operates closing its contacts 451 to complete the circuit for operating the contactor 520, whereby the contactor 505 effects energization of the lower oven unit 516 and the upper oven unit 515 in the oven cavity 102. Upper unit 515 is energized across 118 v., whereas unit 516 is energized across 236 v. Of course, the thermistor 451 cooperates with the composite resistance of the parallel resistors 373 and 374 selectively to control the balance of the bridge 450 and consequently the positions of the relay 470 and the contactor 520 for the purpose of maintaining the preset hold temperature of 450° F. in the oven cavity 102, as established by the composite resistance of the parallel connected resistors 373 and 374.

Accordingly, the supply of heat energy to the units 516 and 515 is modulated to maintain the temperature in the oven cavity 102 substantially at the hold temperature of 450° F., as preset by the oven cooking card 1600 in its inserted position in the magazine 300.

As the cooking operation continues, the temperature of the food contained in the oven cavity 102 rises; whereby the temperature of the oven probe 620 is correspondingly increased, resulting in a corresponding decrease of the resistance thereof so that the meter 561 registers a corresponding increase in the temperature sensed by the oven probe 620, as indicated by the cooperation between the needle 563 and the cooperating scale 566. Ultimately when the registration of the meter 561 matches the critical temperature of 180° F. previously registered in the probe controller 560 by the oven cooking card 1600 in its inserted position in the card magazine 300, the electric contact 564 engages the electric contact 571, thereby to complete a circuit for energizing the winding of the test relay 630. More particularly, the winding of the test relay 630 is bridged across the conductors 604 and 661, the path including the conductor 662 and the closed contacts 571—564; whereby the winding of the test relay 630 is energized causing the latter relay to operate. Upon operating the test relay 630 prepares at the contacts 631 a circuit for operating the lockout relay 640; however, without effect in the present example, since it is not the surface unit probe 610 that is being utilized in the present cooking operation. Also, the test relay 630 completes at the contacts 632 a circuit for energizing the lockout relay 650 across the secondary winding 607 of the transformer 605, this circuit including the conductor 661, the closed contacts 632, the winding of the lockout relay 650, the conductor 603, the closed contacts 323"—322" and the conductor 601. Accordingly, the lockout relay 650 operates to complete, at the contacts 653, a locking circuit for energizing the winding thereof indepndent of the position of the test relay 630, the locking circuit mentioned including the conductor 661, the closed contact 653, the winding of the lockout relay 650, the conductor 603, the closed contacts 323"—322" and the conductor 601. Also, the lockout relay 650 completes at the contacts 652 a connection between the conductors 279 and 662, thereby to effect operation of the audible signal or buzzer 608, so as to indicate to the cook that the present cooking operation in the oven cavity 102 has been terminated.

Finally, the lockout relay 650 interrupts, at the contacts 651, the normal connection between the conductors 384 and 384', thereby to insure the restoration of the relay 470 and the consequent restoration of the contactor 520, with the result that the units 516 and 515 are de-energized. Accordingly, at this time, the cooking operation in the oven cavity 102 is terminated.

In order to restore the control of the oven cavity 102 to the manually operable control 400, it is only necessary for the cook to remove the card 1600 from the magazine 300, as previously explained. At this time, the opening of the switch springs 322"—323" interrupts the holding circuit for retaining operated the lockout relay 650, whereby the latter relay restores to interrupt at the contacts 652 the circuit for operating the audible signal or buzzer 608, also upon restoring the lockout relay 650 reconnects at the contacts 651 the conductors 384 and 384'.

*Section 6.—Continuous Operation of the Surface Heating Unit 501 Under the Control of the Individually Associated Controller 200*

The manually operable surface unit controller 200 is operated out of its "off" position into the desired temperature range involving its "warm," "boil" and "fry" positions. In the arrangement, the warm range may correspond to the temperature range 120°–220° F.; the boil range may correspond to the temperature range 220°–320° F.; and the fry range may correspond to the temperature range 320°–420° F.

Now assuming that the dial 202 is rotated from its "off" position into its "warm" position, as indicated by the cooperating index marker 203, this rotation of the operating shaft 201 effects closure of the switches 231, 232 and 234 and effects adjustment of the potentiometer 210 to a relatively high effective resistance. Also, it is assumed that the manual controller 540 is set in its "manual control" position. Closure of the switch 232 connects the line conductor 241 to the conductor 279; whereby the limiting resistor 457 limits the current conducted through the crystal rectifier 458, and the crystal rectifier 458 effects the supply of B+ potential upon the conductor 388, which potential is connected via the limiting resistor 259 to the conductor 273 and thence to the anode of the triode section 254, for a purpose more fully explained below. Also, the supply of power to the conductor 279 effects energization of the primary winding 356 of the transformer 355; whereby the voltage induced in the secondary winding 357 thereof is impressed between the conductors 283 and 286 and thence directly to the input terminals of the surface unit bridge 250. At this time, the adjusted potentiometer 210 is connected between the conductors 285 and 286; the conductor 286 is connected directly to one of the input terminals of the bridge 250; and the conductor 285 is connected via the closed switch springs 322 and 323 to the conductor 272 and thence to one of the output terminals of the bridge 250, the other output terminal of the bridge 250 being connected directly to the grounded neutral conductor 243.

At this time, it is assumed that the bottom of the cooking vessel on surface heating unit 501 is cold, and that accordingly, the thermistor 251 senses the cold temperature, and its resistance is exceedingly high, with the result that the bridge 250 is severely unbalanced, thereby applying via the conductor 272 a large bias to the grid of the triode section 254, with the result that the triode section 254 is rendered non-conductive; whereby the bias applied via the capacitor 262 to the conductor 274 and thence to the control grid of the tetrode section 255 is small rendering the tetrode section 255 conductive. Accordingly, the relay 270 is energized, the circuit extending from the line conductor 241 via the closed switch 231, the conductor 280, the switch springs 549' and 548', the conductor 280', the switch springs 348 and 349, the conductor 276, the closed contacts 641, the conductor 276' and the winding of the relay 270 to the conductor 275 extending the anode of the tetrode section 255, the cathode of the tetrode section 255 being connected to the grounded neutral conductor 243. Thus, the relay 270 operates closing its contacts 271; whereby the grounded neutral conductor 243 is connected to the conductor 277, with the result that the contactor 505 operates through the circuit including conductor 279, closed switch 232, and line conductor 241. Upon operating, the contactor 505 completes at its contact bridging member 506 and its front contacts a circuit including the conductor 502 for bridging the surface heating unit 501 across the conductors 278 and 279. The conductor 279 is connected to the line conductor 241 via the closed switch 232; while the conductor 278 is connected to the line conductor 242 via the closed switch 234. Hence, the surface heating unit 501 is energized across the line conductors 241 and 242 at 236 volts, with the result that the temperature thereof rapidly rises effecting corresponding heating of the bottom of the cooking vessel. The resistance of the thermistor 251 decreases in proportion to the increase in the temperature thereof, resulting from the sensing of the temperature of the bottom of the cooking vessel supported by the platform provided by the surface heating unit 501. As the resistance of the thermistor 251 decreases, the balance of the bridge 250 is improved, with the result that the bias applied therefrom to the conductor 272 and thence to the control grid of the triode section 254 is reduced. Ultimately, when the temperature sensed by the thermistor 251 matches that set by the adjusted position of the potentiometer 210, the bridge 250 is substantially balanced; whereby the bias applied to the conductor 272 and thence to the control grid of the triode section 254 is substantially removed; whereby the triode section 254 is rendered conductive, with the result that the bias applied via the conductor 273 and the capacitor 262 is increased; whereby this bias applied via the conductor 274 to the control grid of the tetrode section 255 drives the tetrode section 255 substantially to cut-off, with the result that the current traversing the winding of the relay 270 is reduced effectively to bring about the restoration of the relay 270. Upon restoring, the relay 270 opens its contacts 271, thereby deenergizing the winding of the contactor 505. Upon restoring, the contactor 505 deenergizes heating unit 501, with the result that the temperature of the cooking vessel supported thereon subsides. The temperature of the thermistor 251 is decreased so that the resistance thereof is increased. As the temperature of the cooking vessel and the resistance of the thermistor 251 increases, the bias applied from the bridge 250 to the control grid of the triode section 254 drives the triode section 254 substantially toward cut-off, thereby reducing the bias applied via the conductor 273 to the control grid of the tetrode section 255, with the result that the tetrode section 255 becomes conductive; whereby the winding of the relay 270 is reenergized causing the same to operate in order to bring about reoperation of the contactor 505, in the manner previously explained. Upon reoperating, the contactor 505 recompletes the previously traced circuit for energizing the surface heating unit 501.

Accordingly, the thermistor 251 sensing the temperature of the bottom of the cooking vessel cooperates with the adjusted position of the potentiometer 210 in order variably to maintain the balance of the bridge 250, with the result that the amplifier sections 254 and 255 are controlled so as selectively to operate and to restore the relay 270, with the result that the contactor 505 is selectively operated and restored in order selectively to complete and to interrupt the circuit for energizing the surface heating unit 501. Accordingly, the supply of heat energy to the surface heating unit 501 is modulated to maintain substantially the temperature of the bottom of the supported cooking vessel mentioned at that preset by the potentiometer 210 as a result of the setting of the dial 202 in its "warm" position in cooperation with the associated index marker 203.

Similar operational conditions attend the setting of the dial 202 to the other control positions.

Section 7.—A Time Controlled Operation of the Surface Heating Unit 501 Under the Joint Control of the Individually Associated Surface Unit Controller 200 and the Time Clock Controller 530

In order to carry out a cooking operation involving the surface heating unit 501 under the joint control of the individually associated surface unit controller 200 and the time clock controller 530, it is first necessary for the cook to determine when the desired cooking operation is to terminate and correspondingly to set the selected stop-time into the time clock controller 530 by manipulation of the manually operable "stop-time" control knob 533. Also, it is necessary for the cook to determine the time interval of the cooking operation and correspondingly set the preselected start-time into the time clock controller 530 by manipulation of the manually operable "time-to-cook" control knob 531. Again, it is assumed that the cook desires the cooking operation to terminate at 5:00 o'clock and to occupy a time interval of 1 hour and 15 minutes; whereby the start-clock time is accordingly 3:45. Also at this time, the cook operates the dial 542 of the manually operable controller 540 from the "manual control" into its "timed surface" position, as indicated by the cooperating index marker 543. Further, the cook operates the surface unit controller 200 from its "off" position into the desired temperature range involving its "warm," "boil" and "fry" positions; and it may be assumed that the dial 202 is rotated from its "off" position into its "warm" position, as indicated by the cooperating index marker 203, so as correspondingly to adjust the potentiometer 210; all in the manner explained in Section 6.

Finally, it is assumed at the present time of the clock proper 538 is at some time preceding the start-clock time of 3:45; and that the cook has placed the cooking vessel upon the surface heating unit 501. Operation of the surface unit controller 200 into its "warm" position effects closure of the switches 231, 232 and 234, as previously noted; however, the cooking operation does not proceed immediately by virtue of the fact that the manually operable controller 540 occupies its "timed surface" position placing the carrying out of the cooking operation under the time control of the time clock controller 530. More particularly, closure of the switch 231 to connect the line conductor 241 to the conductor 280 is without effect at this time, by virtue of the fact that the switch spring 549' terminating the conductor 280 disengages the switch spring 548' terminating the conductor 280', with the manually operable controller 540 in its "timed surface" position.

Accordingly, in the present example, the carrying out of the cooking operation is delayed until the clock time of 3:45 arrives; whereby the time clock controller 530 operates the bridge 539 to close the contacts 535 and 536, with the result that the line conductor 241 is connected to the conductor 382 that is terminated by the switch spring 546' that engages the switch spring 547' terminating the conductor 280' with the manually operable controller 540 in its "timed surface" position. Accordingly, the closure of the contacts 535 and 536 at the start-clock time connects the conductor 241 via the above traced path to the conductor 280', which conductor 280' is connected via the closed switch springs 348–349 to the conductor 276 that extends via the closed contacts 641 and the conductor 276' to one terminal of the relay 270. Accordingly, at this time, the relay 270 is operated, it being assumed that the bridge 250 is unbalanced by virtue of the fact that the resistance of the thermistor 251 mismatches the resistance of the adjusted potentiometer 210, the thermistor 251 being cold at this time. Hence the relay 270 operates effecting operation of the contactor 505 and the consequent energization of the surface unit 501. Of course, the thermistor 251 co-operates with the adjusted position of the potentiometer 210 selectively to control the balance of the bridge 250 and consequently the positions of the relay 270 and the contactor 505 for the purpose of maintaining the preset temperature of the bottom of the cooking vessel supported by the surface unit 501, as established by the adjustment of the potentiometer 210 with the surface unit controller 200 in its "warm" position, all in the manner explained in Section 6.

The cooking operation continues until 5:00 o'clock, whereupon the time clock controller 530 operates the contacts 535 and 536 into disengagement, thereby to remove the application of power from the conductor 382, with the result that the relay 270 is retained in its restored position, retaining the contactor 505 in its restored position so that the surface unit 501 is deenergized. At this time, the cooking operation is thus terminated at the stop-clock time of 5:00 o'clock. At the conclusion of the cooking operation, the cook normally restores the surface unit controller 200 from its "warm" position back into its "off" position; whereby all of the switches 231 to 234, inclusive, are restored into their open positions. Also, at this time, it is normal for the cook to restore the manually operable controller 540 from its "timed surface" position back into its "manual control" position.

Section 8.—Conclusion

It will be understood that a series of the surface cooking cards, including the card 1700, will be provided in conjunction with the electric range 100, so that the selective insertion of the various ones of these surface cooking cards into the magazine 300 will bring about corresponding automatic cooking operations involving the surface unit 501, and substantially identical to the automatic cooking operation described herein, but involving different hold and critical temperatures of the cooking operations. Likewise a series of the oven cooking cards, including the card 1600, will be provided in conjunction with the electric range 100, so that the selective insertions of the various ones of these oven cooking cards into the magazine 300 will bring about corresponding automatic cooking operations involving the oven cavity 102, and substantially identical to the automatic cooking operation described herein, but involving different hold and critical temperatures of the cooking operations. More particularly, it will be appreciated that the configuration of the triangular slots 1691, 1791, etc., provided on the left-hand side of the cooking cards 1600, 1700, etc., may be suitably varied so as correspondingly to set a variable critical temperature into the probe controller 560, since the critical temperature mentioned is proportional to the rotation of the arm 570 in the magazine that, in turn, is proportional to the extent of the left-hand leg of the triangular slot 1691, etc., toward the left of the card 1600, etc. Also, it will be appreciated that the particular arrangement of the holes or apertures 1616, etc., provided in the various cooking cards 1600, etc., that respectively co-operate with the feelers 314, 315, 316 and 317 in the magazine 300 may be suitably varied in order to bring about any combination as may be desired of the connection of the various ones of the resistors 371, 372, 373 and 374 across the conductors 379 and 389; which combinations of resistors mentioned variably preset the balance of the corresponding one of the bridges 250 or 450 and thus the temperature against which the corresponding one of the thermistors 251 or 451 is matched in order to obtain a balance of the corresponding one of the bridges 250 or 450.

In view of the foregoing, it is apparent that there has been provided in an electric range an improved combination manual and automatic time and temperature control system that may be employed selectively to carry out cooking operations in a ready and simple manner. Also, it will be appreciated that by the utilization of the various preformed cooking cards in the card magazine, the cook may readily carry out various and sundry precise cooking operations involving a wide variety of particular recipes merely by the utilization of the proper one of the cooking cards in the card magazine.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a cooking appliance, a first heating unit adapted to support a cooking vessel, a first temperature sensing unit arranged to sense the temperature of a cooking vessel supported by said first heating unit, a second heating unit operatively associated with an oven cavity, a second temperature sensing unit arranged to sense the temperature of said oven cavity, a first controller for selectively presetting a desired hold temperature either of a cooking vessel supported by said first heating unit or of said oven cavity, a first temperature sensing probe arranged to sense the temperature of food contained in a cooking vessel supported by said first heating unit, a second temperature sensing probe arranged to sense the temperature of food contained in said oven cavity, a second controller for selectively presetting a desired critical temperature either of food contained in a cooking vessel supported by said first heating unit or of food contained in said oven cavity, a card magazine adapted selectively to receive a removable cooking control card, a plurality of cooking control cards, a first control circuit governed jointly by a first of said cards in said magazine and by said first temperature sensing unit and by said first controller for selectively supplying heat energy to said first heating unit to maintain the temperature of a cooking vessel supported thereby substantially at the hold temperature preset by said first controller, a second control circuit governed jointly by said first card in said magazine and by said first temperature sensing probe and by said second controller for arresting the supply of heat energy to said first heating unit so as to prevent the temperature of food contained in a cooking vessel supported thereby from exceeding substantially the critical temperature preset by said second controller, a third control circuit governed jointly by a second of said cards in said magazine and by said second temperature sensing unit and by said first controller for selectively supplying heat energy to said second heating unit to maintain the temperature of said oven cavity substantially at the hold temperature preset by said first controller, and a fourth control circuit governed jointly by said second card in said magazine and by said second temperature sensing probe and by said second controller for arresting the supply of heat energy to said second heating unit so as to prevent the temperature of food contained in said oven cavity from exceeding substantially the critical temperature preset by said second controller.

2. The cooking appliance set forth in claim 1, wherein said first card in said magazine also actuates said first controller to preset a corresponding first hold temperature, and said second card in said magazine also actuates said first controller to preset a corresponding second hold temperature.

3. The cooking appliance set forth in claim 1, wherein said first card in said magazine also actuates said second controller to preset a corresponding first critical temperature, and said second card in said magazine also actuates said second controller to preset a corresponding second critical temperature.

4. The cooking appliance set forth in claim 1, wherein said first card in said magazine also actuates said first controller to preset a corresponding first hold temperature and actuates said second controller to preset a corresponding first critical temperature, and said second card in said magazine also actuates said first controller to preset a corresponding second hold temperature and actuates said second controller to preset a corresponding second critical temperature.

5. In a cooking appliance, a heating unit adapted to support a cooking vessel, a temperature sensing unit arranged to sense the temperature of a cooking vessel supported by said heating unit, a first controller for selectively presetting a desired hold temperature of a cooking vessel supported by said heating unit, a temperature sensing probe arranged to sense the temperature of food contained in a cooking vessel supported by said heating unit, a second controller for selectively presetting a desired critical temperature of food contained in a cooking vessel supported by said heating unit, a card magazine adapted selectively to receive a removable cooking control card, a plurality of cooking control cards respectively corresponding to a plurality of different hold temperatures of a cooking vessel supported by said heating unit, means governed by one of said cards in said magazine for actuating said first controller to preset a corresponding hold temperature, a first control circuit governed jointly by said temperature sensing unit and by said first controller for selectively supplying heat energy to said heating unit to maintain the temperature of a cooking vessel supported thereby substantially at the hold temperature preset by said first controller, and a second control circuit governed jointly by said temperature sensing probe and by said second controller for arresting the supply of heat energy to said heating unit so as to prevent the temperature of food contained in a cooking vessel supported thereby from exceeding substantially the critical temperature preset by said second controller.

6. In a cooking appliance, a heating unit adapted to support a cooking vessel, a temperature sensing unit arranged to sense the temperature of a cooking vessel supported by said heating unit, a first controller for selectively presetting a desired hold temperature of a cooking vessel supported by said heating unit, a temperature sensing probe arranged to sense the temperature of food contained in a cooking vessel supported by said heating unit, a second controller for selectively presetting a desired critical temperature of food contained in a cooking vessel supported by said heating unit, a card magazine adapted selectively to receive a removable cooking control card, a plurality of cooking control cards respectively corresponding to a plurality of different critical temperatures of food contained in a cooking vessel supported by said heating unit, means governed by one of said cards in said magazine for actuating said second controller to preset a corresponding critical temperature, a first control circuit governed jointly by said temperature sensing unit and by said first controller for selectively supplying heat energy to said heating unit to maintain the temperature of a cooking vessel supported thereby substantially at the hold temperature preset by said first controller, and a second control circuit governed jointly by said temperature sensing probe and by said second controller for arresting the supply of heat energy to said heating unit so as to prevent the temperature of food contained in a cooking vessel supported thereby from exceeding substantially the critical temperature preset by said second controller.

7. In a cooking appliance, a heating unit adapted to support a cooking vessel, a temperature sensing unit arranged to sense the temperature of a cooking vessel supported by said heating unit, a first controller for selectively presetting a desired hold temperature of a cooking vessel supported by said heating unit, a temperature sensing probe arranged to sense the temperature of food contained in a cooking vessel supported by said heating unit, a second controller for selectively presetting a desired critical temperature of food contained in a cooking vessel supported by said heating unit, a card magazine adapted selectively to receive a removable cooking control card, a plurality of cooking control cards respectively corresponding to a plurality of different hold temperatures of a cooking vessel supported by said heating unit and to a plurality of different critical temperatures of a food contained in a cooking vessel supported by said heating unit, whereby each one of said cards corresponds to one hold temperature and to one critical temperature, means governed by one of said cards in said magazine for actuating said first controller to preset a corresponding hold temperature and for actuating said second controller to preset a corresponding critical temperature, a first control circuit governed jointly by said temperature sensing unit and by said first controller for selectively supplying heat energy to said heating unit to maintain the temperature of a cooking vessel supported thereby substantially at the hold temperature preset by said first controller, and a second control circuit governed jointly by said temperature sensing probe and by said second controller for arresting the supply of heat energy to said heating unit so as to prevent the temperature of food contained in a cooking vessel supported thereby from exceeding substantially the critical temperature preset by said second controller.

8. In a cooking appliance, a heating unit adapted to support a cooking vessel, a temperature sensing unit arranged to sense the temperature of a cooking vessel supported by said heating unit, a manually operable control device having a plurality of control positions respectively corresponding to different desired hold temperatures of a cooking vessel supported by said heating unit, a normally able first control circuit governed jointly by said control device in one of its control positions and by said temperature sensing unit for selectively supplying heat energy to said heating unit to maintain the temperature of a cooking vessel supported thereby substantially at the hold temperature preset by said control device in its one control position, a first controller for selectively presetting a desired hold temperature of a cooking vessel supported by said heating unit, a temperature sensing probe arranged to sense the temperature of food contained in a cooking vessel supported by said heating unit, a second controller for selectively presetting a desired critical temperature of food contained in a cooking vessel supported by said heating unit, a card magazine adapted selectively to receive a removable cooking control card, a plurality of cooking control cards respectively corresponding to a plurality of different hold temperatures of a cooking vessel supported by said heating unit, means governed by any one of said cards in said magazine for disabling said first control circuit and for actuating said first controller to preset a corresponding hold temperature, a second control circuit governed jointly by said temperature sensing unit and by said first controller and by said one card in said magazine for selectively supplying heat energy to said heating unit to maintain the temperature of a cooking vessel supported thereby substantially at the hold temperature preset by said first controller, and a third control circuit governed jointly by said temperature sensing probe and by said second controller and by said one card in said magazine for arresting the supply of heat energy to said heating unit so as to prevent the temperature of food contained in a cooking vessel supported thereby from exceeding substantially the critical temperature preset by said second controller.

9. In a cooking appliance, a heating unit adapted to support a cooking vessel, a temperature sensing unit arranged to sense the temperature of a cooking vessel supported by said heating unit, a manually operable control device having a plurality of control positions respectively corresponding to different desired hold temperatures of a cooking vessel supported by said heating unit, a normally able first control circuit governed jointly by said control device in one of its control positions and by said temperature sensing unit for selectively supplying heat energy to said heating unit to maintain the temperature of a cooking vessel supported thereby substantially at the hold temperature preset by said control device in its one control position, a first controller for selectively presetting a desired hold temperature of a cooking vessel supported by said heating unit, a temperature sensing probe arranged to sense the temperature of food contained in a cooking vessel supported by said heating unit, a second controller for selectively presetting a desired critical temperature of food contained in a cooking vessel supported by said heating unit, a card magazine adapted selectively to receive a removable cooking control card, a plurality of cooking control cards respectively corresponding to a plurality of different critical temperatures of food contained in a cooking vessel supported by said heating unit, means governed by any one of said cards in said magazine for disabling said first control circuit and for actuating said second controller to preset a corresponding critical temperature, a second control circuit governed jointly by said temperature sensing unit and by said first controller and by said one card in said magazine for selectively supplying heat energy to said heating unit to maintain the temperature of a cooking vessel supported thereby substantially at the hold temperature preset by said first controller, and a third control circuit governed jointly by said temperature sensing probe and by said second controller and by said one card in said magazine for arresting the supply of heat energy to said heating unit so as to prevent the temperature of food contained in a cooking vessel supported thereby from exceeding substantially the critical temperature preset by said second controller.

10. In a cooking appliance, a heating unit adapted to support a cooking vessel, a temperature sensing unit arranged to sense the temperature of a cooking vessel supported by said heating unit, a manually operable control device having a plurality of control positions respectively corresponding to different desired hold temperatures of a cooking vessel supported by said heating unit, a normally able first control circuit governed jointly by said control device in one of its control positions and by said temperature sensing unit for selectively supplying heat energy to said heating unit to maintain the temperature of a cooking vessel supported thereby substantially at the hold temperature preset by said control device in its one position, a first controller for selectively presetting a desired hold temperature of a cooking vessel supported by said heating unit, a temperature sensing probe arranged to sense the temperature of food contained in a cooking vessel supported by said heating unit, a second controller for selectively presetting a desired critical temperature of food contained in a cooking vessel supported by said heating unit, a card magazine adapted selectively to receive a removable cooking control card, a plurality of cooking control cards respectively corresponding to a plurality of different hold temperatures of a cooking vessel supported by said heating unit and to a plurality of different critical temperatures of a food contained in a cooking vessel supported by said heating unit, whereby each one of said cards corresponds to one hold temperature and to one critical temperature, means governed by any one of said cards in said magazine for disabling said first control circuit and for actuating said first controller to preset a corresponding hold temperature and for actuating said second controller to preset a corresponding critical temperature, a second control circuit governed jointly by said temperature sensing unit and by said first controller and by said one card in said magazine for selectively supplying heat energy to said heating unit to maintain the temperature of a cooking vessel supported thereby substantially at the hold temperature preset by said first controller, and a third control circuit governed jointly by said temperature sensing probe and by said second controller and by said one card in said magazine for arresting the supply of heat energy to said heating unit so as to prevent the temperature of food contained in a cooking vessel supported thereby from exceeding substantially the critical temperature preset by said second controller.

11. In a cooking appliance, a heating unit operatively associated with an oven cavity, a temperature sensing unit arranged to sense the temperature of said oven cavity, a first controller for selectively presetting a desired hold temperature of said oven cavity, a temperature sensing probe arranged to sense the temperature of food contained in said oven cavity, a second controller for selectively presetting a desired critical temperature of food contained in said oven cavity, a card magazine adapted selectively to receive a removable cooking control card, a plurality of cooking control cards respectively corresponding to a plurality of different hold temperatures of said oven cavity, means governed by one of said cards in said magazine for actuating said first controller to preset a corresponding hold temperature, a first control circuit governed jointly by said temperature sensing unit and by said first controller for selectively supplying heat energy to said heating unit to maintain the temperature of said oven cavity substantially at the hold temperature preset by said first controller, and a second control circuit governed jointly by said temperature sensing probe and by said second controller for arresting the supply of heat energy to said heating unit so as to prevent the temperature of food contained in said oven cavity from exceeding substantially the critical temperature preset by said second controller.

12. In a cooking appliance, a heating unit operatively associated with an oven cavity, a temperature sensing unit arranged to sense the temperature of said oven cavity, a first controller for selectively presetting a desired hold temperature of said oven cavity, a temperature sensing probe arranged to sense the temperature of food contained in said oven cavity, a second controller for selectively presetting a desired critical temperature of food contained in said oven cavity, a card magazine adapted selectively to receive a removable cooking control card, a plurality of cooking control cards respectively corresponding to a plurality of different critical temperatures of food contained in said oven cavity, means governed by one of said cards in said magazine for actuating said second controller to preset a corresponding critical temperature, a first control circuit governed jointly by said temperature sensing unit and by said first controller for selectively supplying heat energy to said heating unit to maintain the temperature of said oven cavity substantially at the hold temperature preset by said first controller, and a second control circuit governed jointly by said temperature sensing probe and by said second controller for arresting the supply of heat energy to said heating unit so as to prevent the temperature of food contained in said oven cavity from exceeding substantially the critical temperature preset by said second controller.

13. In a cooking appliance, a heating unit operatively associated with an oven cavity, a temperature sensing unit arranged to sense the temperature of said oven cavity, a first controller for selectively presetting a desired hold temperature of said oven cavity, a temperature sensing probe arranged to sense the temperature of food contained in said oven cavity, a second controller for selectively presetting a desired critical temperature of food contained in said oven cavity, a card magazine adapted selectively to receive a removable cooking control card, a plurality of cooking control cards respectively corresponding to a plurality of different hold temperatures of said oven cavity and to a plurality of different critical temperatures of food contained in said oven cavity, whereby each one of said cards corresponds to one hold temperature and to one critical temperature, means governed by one of said cards in said magazine for actuating and first controller to preset a corresponding hold temperature and for actuating said second controller to preset a corresponding critical temperature, a first control circuit governed jointly by said temperature sensing unit and by said first controller for selectively supplying heat energy to said heating unit to maintain the temperature of said oven cavity substantially at the hold temperature preset by said first controller, and a second control circuit governed jointly by said temperature sensing probe and by said second controller for arresting the supply of heat energy to said heating unit so as to prevent the temperature of food contained in said oven cavity from exceeding substantially the critical temperature preset by said second controller.

14. In a cooking appliance, a heating unit, a temperature sensing probe arranged to sense the temperature of food being cooked by heat from said heating unit, a card magazine adapted selectively to receive a removable cooking control card, a plurality of cooking control cards respectively corresponding to a plurality of different critical temperatures of food being cooked by heat from said heating unit, a controller for selectively presetting a desired critical temperature of food being cooked by heat delivered by said heating unit, means for initiating the supply of heat energy to said heating unit, means governed by one of said cards in said magazine for actuating said controller to preset a corresponding critical temperature, and means governed jointly by said temperature sensing probe and by said controller and by said one card in said magazine for arresting the supply of heat energy to said heating unit so as to prevent the temperature of food being cooked by heat therefrom from exceeding substantially the critical temperature preset by said controller.

15. The cooking appliance set forth in claim 14, wherein said cards have a variable pattern of holes therein and said controller has a cooperating control arm that is variably set by the different holes in said cards in order to effect the selective presetting of the different critical temperatures respectively corresponding to said cards.

16. In a cooking appliance, a heating unit, a temperature sensing probe arranged to sense the temperature of food being cooked by heat from said heating unit, a card magazine adapted selectively to receive a removable cooking control card, a plurality of cooking control cards respectively corresponding to a plurality of different critical temperatures of food being cooked by heat from said heating unit, a controller for selectively presetting a desired critical temperature of food being cooked by heat from said heating unit, means governed by any one of said cards in said magazine for initiating the supply of heat energy to said heating unit and for actuating said controller to preset a corresponding critical temperature, and means governed jointly by said temperature sensing probe and by said controller and by said one card in said magazine for arresting the supply of heat energy to said heating unit so as to prevent the temperature of food being cooked by heat therefrom from exceeding substantially the critical temperatures preset by said controller.

17. In a cooking appliance, a heating unit, a temperature sensing probe arranged to sense the temperature of food being cooked by heat from said heating unit, a card magazine adapted selectively to receive a removable cooking control card, a plurality of cooking control cards respectively corresponding to a plurality of different critical temperatures of food being cooked by heat from said heating unit, a controller for selectively presetting a desired critical temperature of food being cooked by heat delivered by said heating unit, a first control circuit completed by any one of said cards in said magazine, means responsive to the completion of said first control circuit for initiating the supply of heat energy to said heating unit, means governed by said one card in said magazine for actuating said controller to preset a corresponding critical temperature, a second control circuit completed jointly by said temperature sensing probe and by said controller and by said one card in said magazine, and means responsive to the completion of said second control circuit for interrupting the supply of heat energy to said heating unit so as to prevent the temperature of food being cooked by heat therefrom from exceeding substantially the critical temperature preset by said controller.

18. In a cooking appliance, a heating unit, a temperature sensing probe arranged to sense the temperature of food being cooked by heat from said heating unit, a card magazine adapted selectively to receive a removable cooking control card, a plurality of cooking control cards respectively corresponding to a plurality of different critical temperatures of food being cooked by heat from said heating unit, an electric meter for registering temperature, a control circuit for connecting said temperature sensing probe to said meter, a controller for selectively presetting a desired critical temperature of food being cooked by heat delivered by said heating unit, means governed by any one of said cards in said magazine for initiating the supply of heat energy to said heating unit and for completing said control circuit and for actuating said controller to preset a corresponding critical temperature, said meter being operative in response to completion of said control circuit to register the temperature sensed by said temperature sensing probe, and means responsive to the registration by said meter of a temperature substantially matching the critical temperature preset by said controller for arresting the supply of heat energy to said heating unit so as to prevent the temperature of food being cooked by heat therefrom from exceeding substantially the critical temperature preset by said controller.

19. In a cooking appliance, a plurality of heating units respectively arranged in a corresponding plurality of cooking areas, a corresponding plurality of temperature sensing probes respectively arranged to sense the temperatures of foods being cooked by heat from said heating units in the corresponding ones of said cooking areas, a card magazine adapted selectively to receive a removable cooking control card, a plurality of cooking control cards respectively corresponding both to said cooking areas and to a plurality of different critical temperatures of foods being cooked by heat from said heating units in the corresponding ones of said cooking areas, a controller for selectively presetting a desired critical temperature of food being cooked by heat from any one of said heating units in the corresponding one of said cooking areas, means governed by any one of said cards in said magazine for initiating the supply of heat energy to the one of said heating units in the corresponding one of said cooking areas and for actuating said controller to preset a corresponding critical temperature, and means governed jointly by the one of said temperature sensing probes corresponding to said one cooking area and by said controller and by said one card in said magazine for arresting the supply of heat energy to said one heating unit in said one cooking area so as to prevent the temperature of food being cooked by heat therefrom from exceeding substantially the critical temperature preset by said controller.

20. In a cooking appliance, a plurality of heating units respectively arranged in a corresponding plurality of cooking areas, a corresponding plurality of temperature sensing probes respectively arranged to sense the temperatures of foods being cooked by heat from said heating units in the corresponding ones of said cooking areas, a card magazine adapted selectively to receive a removable cooking control card, a plurality of cooking control cards respectively corresponding both to said cooking areas and to a plurality of different critical temperatures of foods being cooked by heat from said heating units in the corresponding ones of said cooking areas, an electric meter for registering temperature, a corresponding plurality of control circuits for respectively connecting said temperature sensing probes to said meter, a controller for selectively presetting a desired critical temperature of food being cooked by heat from any one of said heating units in the corresponding one of said cooking areas, means governed by any one of said cards in said magazine for initiating the supply of heat energy to the one of said heating units in the corresponding one of said cooking areas and for completing the corresponding one of said control circuits and for actuating said controller to preset a corresponding critical temperature and for indicating the particular one of said temperature sensing probes that is connected to said meter, said meter being operative in response to completion of said one control circuit to register the temperature sensed by the corresponding one of said temperature sensing probes, and means governed jointly by said meter and by said controller and by said one card in said magazine for arresting the supply of heat energy to said one heating unit in said one cooking area so as to prevent the temperature of food being cooked by heat therefrom from exceeding substantially the critical temperature preset by said controller.

21. In a cooking appliance, a plurality of heating units respectively arranged in a corresponding plurality of cooking areas, a corresponding plurality of temperature sensing probes respectively arranged to sense the temperatures of foods being cooked by heat from said heating units in the corresponding ones of said cooking areas, a card magazine adapted selectively to receive a removable cooking control card, a plurality of cooking control cards respectively corresponding to said cooking areas, a controller for selectively presetting a desired critical temperature of food being cooked by heat from any one of said heating units in the corresponding one of said cooking areas, means governed by any one of said cards in said magazine for initiating the supply of heat energy to the one of said heating units in the corresponding one of said cooking areas, and means governed jointly by the one of said temperature sensing probes corresponding to said one cooking area and by said controller and by said one card in said magazine for arresting the supply of heat energy to said one heating unit in said one cooking area so as to prevent the temperature of food being cooked by heat therefrom from exceeding substantially the critical temperature preset by said controller.

22. In a cooking appliance, a plurality of heating units respectively arranged in a corresponding plurality of cooking areas, a corresponding plurality of temperature sensing probes respectively arranged to sense the temperature of foods being cooked by heat from said heating units in the corresponding ones of said cooking areas, a card magazine adapted selectively to receive a removable cooking control card, a plurality of cooking control cards respectively corresponding to said cooking areas, an electric meter for registering temperature, a corresponding plurality of control circuits for respectively connecting said temperature sensing probes to said meter, a controller for selectively presetting a desired critical temperature of food being cooked by heat from any one of said heating units in the corresponding one of said cooking areas, means governed by any one of said cards in said magazine for initiating the supply of heat energy to the one of said heating units in the corresponding one of said cooking areas and for completing the corresponding one of said control circuits, said meter being operative in response to the completion of said one control circuit to register the temperature sensed by the corresponding one of said temperature sensing probes, and means governed jointly by said meter and by said controller and by said one card in said magazine for arresting the supply of heat energy to said one heating unit in said one cooking area so as to prevent the temperature of food being cooked by heat therefrom from exceeding substantially the critical temperature preset by said controller.

References Cited in the file of this patent

UNITED STATES PATENTS 3,031,558    Euler  ---------------- Apr. 24, 1962

UNITED STATES PATENT OFFICE
CERTIFICATE OF CORRECTION

Patent No. 3,062,943　　　　　　　　　　　　　November 6, 1962

George M. Euler

It is hereby certified that error appears in the above numbered patent requiring correction and that the said Letters Patent should read as corrected below.

Column 25, line 67, for "and" read -- said --; column 26, line 51, for "temperatures" read -- temperature --.

Signed and sealed this 7th day of May 1963.

(SEAL)
Attest:

ERNEST W. SWIDER
Attesting Officer

DAVID L. LADD
Commissioner of Patents